(12) United States Patent
Shigetomi et al.

(10) Patent No.: US 9,650,547 B2
(45) Date of Patent: May 16, 2017

(54) RADIATION-CURABLE PRESSURE-SENSITIVE ADHESIVE, RADIATION-CURABLE PRESSURE-SENSITIVE ADHESIVE LAYER, RADIATION-CURABLE PRESSURE-SENSITIVE ADHESIVE SHEET, AND LAMINATE

(71) Applicant: NITTO DENKO CORPORATION, Ibaraki-shi, Osaka (JP)

(72) Inventors: Kiyoe Shigetomi, Ibaraki (JP); Shou Takarada, Ibaraki (JP); Masahiko Ando, Ibaraki (JP); Katsuhiko Kamiya, Ibaraki (JP); Takahiro Nonaka, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 595 days.

(21) Appl. No.: 13/954,686

(22) Filed: Jul. 30, 2013

(65) Prior Publication Data

US 2014/0037952 A1 Feb. 6, 2014

(30) Foreign Application Priority Data

Jul. 31, 2012 (JP) .................................. 2012-169994
Feb. 15, 2013 (JP) .................................. 2013-028076

(51) Int. Cl.
 *C09J 7/02* (2006.01)
 *C09J 133/08* (2006.01)
 (Continued)

(52) U.S. Cl.
 CPC ............... *C09J 7/0217* (2013.01); *B32B 3/10* (2013.01); *B32B 7/12* (2013.01); *C08F 20/68* (2013.01);
 (Continued)

(58) Field of Classification Search
 None
 See application file for complete search history.

(56) References Cited

U.S. PATENT DOCUMENTS 4,943,461 A 7/1990 Karim
5,814,685 A * 9/1998 Satake ................. C09D 11/326
 347/100

(Continued)

FOREIGN PATENT DOCUMENTS

CN 1693401 A 11/2005
CN 101490194 A 7/2009

(Continued)

OTHER PUBLICATIONS

Aldrich Data Sheet (2016).*

(Continued)

*Primary Examiner* — Frank D Ducheneaux
(74) *Attorney, Agent, or Firm* — Sughrue Mion, PLLC

(57) ABSTRACT

Provided is a pressure-sensitive adhesive capable of realizing a pressure-sensitive adhesive layer having satisfactory adhesion performance and a high ink step absorbability. A radiation-curable pressure-sensitive adhesive, which contains a (meth)acryl-based polymer obtained by polymerizing a monomer component containing 30 to 90% by weight of an alkyl(meth)acrylate having an alkyl group of 10 to 22 carbon atoms at an ester end, and having a radically polymerizable functional group containing a carbon-carbon double bond.

13 Claims, 2 Drawing Sheets

(51) Int. Cl.

| | | |
|---|---|---|
| *C09J 133/14* | (2006.01) | |
| *B32B 7/12* | (2006.01) | |
| *B32B 3/10* | (2006.01) | |
| *C08F 20/68* | (2006.01) | |
| *C08F 220/68* | (2006.01) | |
| *C08K 5/00* | (2006.01) | |

(52) U.S. Cl.
CPC .......... *C08F 220/68* (2013.01); *C09J 133/08* (2013.01); *C09J 133/14* (2013.01); *C08K 5/0025* (2013.01); *C09J 2201/606* (2013.01); *C09J 2203/318* (2013.01); *C09J 2433/00* (2013.01); *Y10T 428/24851* (2015.01); *Y10T 428/2891* (2015.01); *Y10T 428/31935* (2015.04)

(56) References Cited

U.S. PATENT DOCUMENTS

| | | | | |
|---|---|---|---|---|
| 6,630,239 B2 * | 10/2003 | Cernohous | ............ | C09J 121/00 428/354 |
| 7,070,051 B2 * | 7/2006 | Kanner | ............ | A61B 17/06133 206/382 |
| 7,385,078 B2 * | 6/2008 | Varlemann | ............ | C07C 69/54 526/328 |
| 2003/0232192 A1 | 12/2003 | Kishioka et al. | | |
| 2004/0191509 A1 | 9/2004 | Kishioka et al. | | |
| 2005/0054778 A1 * | 3/2005 | Holub | ............ | C08F 265/04 525/203 |
| 2005/0244633 A1 | 11/2005 | Kobayashi et al. | | |
| 2007/0166537 A1 * | 7/2007 | Nagamoto | ............ | B32B 37/12 428/355 AC |
| 2007/0218276 A1 * | 9/2007 | Hiramatsu | ............ | C09J 7/0217 428/354 |
| 2009/0258224 A1 * | 10/2009 | Kawabe | ............ | C09J 7/0246 428/339 |
| 2010/0029060 A1 | 2/2010 | Kamiya et al. | | |
| 2011/0008597 A1 * | 1/2011 | Asai | ............ | C09J 7/02 428/213 |
| 2011/0076492 A1 * | 3/2011 | Fujita | ............ | C08J 3/245 428/355 AC |
| 2011/0111220 A1 * | 5/2011 | Takarada | ............ | C09J 7/00 428/345 |
| 2011/0112249 A1 | 5/2011 | Takarada et al. | | |
| 2012/0094037 A1 * | 4/2012 | Banba | ............ | C09J 7/00 428/1.5 |
| 2012/0165489 A1 | 6/2012 | Takahashi | | |
| 2012/0328891 A1 | 12/2012 | Suwa et al. | | |
| 2013/0211028 A1 * | 8/2013 | Shinike | ............ | G06F 3/044 526/307.5 |
| 2013/0236674 A1 | 9/2013 | Kim et al. | | |

FOREIGN PATENT DOCUMENTS

| | | | |
|---|---|---|---|
| CN | 102051132 A | 5/2011 | |
| JP | 61-083274 A | 4/1986 | |
| JP | 05-065467 A | 3/1993 | |
| JP | 07-278502 A | 10/1995 | |
| JP | 2000-053929 A | 2/2000 | |
| JP | 2000-256635 | 9/2000 | |
| JP | 2002-363530 A | 12/2002 | |
| JP | 2003-238915 A | 8/2003 | |
| JP | 2003-342542 A | 12/2003 | |
| JP | 2004-231723 A | 8/2004 | |
| JP | 2005-023114 A | 1/2005 | |
| JP | 2006-045474 A | 2/2006 | |
| JP | 2009-179781 A | 8/2009 | |
| JP | 2010-062542 A | 3/2010 | |
| JP | 2011-184582 A | 9/2011 | |
| JP | 2011-243852 A | 12/2011 | |
| JP | 2012-025808 A | 2/2012 | |
| JP | 2012-136678 A | 7/2012 | |
| JP | 2013-544931 A | 12/2013 | |
| JP | 2014-009314 A | 1/2014 | |
| WO | 2011/016148 A1 | 2/2011 | |
| WO | WO 2011/112508 A1 * | 9/2011 | ............ C09J 133/00 |
| WO | WO 2012/023567 A1 * | 2/2012 | ............ C09J 133/14 |
| WO | 2012/077806 A1 | 6/2012 | |

OTHER PUBLICATIONS

Office Action dated Mar. 21, 2016 from the State Intellectual Property Office of P. R. China issued in Chinese Application No. 201310326065.0.

Office Action dated Apr. 28, 2016 from the State Intellectual Property Office of P. R. China issued in Chinese Application No. 201310325927.8.

Notice of Reasons for Refusal issued on Aug. 5, 2016 from the Japanese Patent Office in corresponding Japanese Application No. 2013-028076.

Office Action issued on Sep. 6, 2016 from the Japanese Patent Office in corresponding Japanese Application No. 2013-043195.

Office Action dated Nov. 3, 2016 issued from the Taiwanese Patent Office in Taiwanese Application No. 102127285.

Office Action dated Dec. 12, 2016 issued from the State Intellectual Property Office of P. R. China in Chinese Application No. 201310326065.0.

Decision of Refusal dated Mar. 10, 2017 issued by the Japanese Patent Office in corresponding JP Application 2013-043195.

\* cited by examiner

RADIATION-CURABLE PRESSURE-SENSITIVE ADHESIVE, RADIATION-CURABLE PRESSURE-SENSITIVE ADHESIVE LAYER, RADIATION-CURABLE PRESSURE-SENSITIVE ADHESIVE SHEET, AND LAMINATE

TECHNICAL FIELD

The present invention relates to a radiation-curable pressure-sensitive adhesive capable of achieving a low dielectric constant; a radiation-curable pressure-sensitive adhesive layer obtained from the pressure-sensitive adhesive; and a radiation-curable pressure-sensitive adhesive sheet having a support and the radiation-curable pressure-sensitive adhesive layer formed on at least one side of the support. The present invention further relates to a laminate wherein a first member and a second member are bonded with the pressure-sensitive adhesive layer interposed therebetween. The present invention is particularly useful in a case where at least one of the first member and the second member is a member having a surface with an ink step, and the pressure-sensitive adhesive layer of the present invention can follow the ink step so that it can be bonded without gaps.

The radiation-curable pressure-sensitive adhesive layer or the radiation-curable pressure-sensitive adhesive sheet of the invention is suitable for use in optical applications. For example, the radiation-curable pressure-sensitive adhesive layer or the radiation-curable pressure-sensitive adhesive sheet of the invention is suitable for use in the manufacture of image display devices such as liquid crystal display devices, organic electro-luminescent (EL) display devices, plasma display panels (PDPs), and electronic paper, and is also suitable for use in the manufacture of input devices such as touch panels including optical, ultrasonic, capacitance, and resistive types. In particular, the pressure-sensitive adhesive layer or the pressure-sensitive adhesive sheet of the invention is advantageously used in capacitance touch panels.

The radiation-curable pressure-sensitive adhesive sheet of the invention is also useful as a pressure-sensitive adhesive optical member, in which an optical member is used as the support. For example, when a transparent conductive film is used as the optical member, the pressure-sensitive adhesive optical member can be used as a pressure-sensitive adhesive layer-carrying transparent conductive film. Such a pressure-sensitive adhesive layer-carrying transparent conductive film may be used as a transparent electrode in the image display device or the touch panel mentioned above after it is processed appropriately. In particular, the pressure-sensitive adhesive layer-carrying transparent conductive film with a patterned transparent conductive thin layer is advantageously used as an electrode substrate for an input device of a capacitance touch panel. Additionally, the pressure-sensitive adhesive layer-carrying transparent conductive film can be used for electromagnetic wave shielding or prevention of static buildup on transparent products and to form liquid crystal dimming glass products and transparent heaters.

When an optical film is used as the optical member, the pressure-sensitive adhesive optical member can be used as a pressure-sensitive adhesive layer-carrying optical film. The pressure-sensitive adhesive layer-carrying optical film is used for an image display device such as a liquid crystal display device and an organic electroluminescence (EL) display device. The optical film may be a polarizing plate, a retardation plate, an optical compensation film, a brightness enhancement film, a laminate thereof, or the like.

BACKGROUND ART

In recent years, input devices having a combination of a touch panel and an image display device, such as cellular phones and portable music players, have become popular. In particular, capacitance touch panels have rapidly become popular because of their functionality.

There are now many known transparent conductive films for use in touch panels, which include a laminate of a transparent plastic film substrate or a glass sheet and a transparent conductive thin layer (ITO layer). A transparent conductive film can be laminated on any other member with a pressure-sensitive adhesive layer interposed therebetween. Various types of pressure-sensitive adhesive layers are proposed (Patent Document 1 to 5).

When the transparent conductive film is used as an electrode substrate for a capacitance touch panel, the transparent conductive thin layer used is patterned. The transparent conductive film with the patterned transparent conductive thin layer is laminated on another transparent conductive film or any other component with a pressure-sensitive adhesive layer interposed therebetween to form a laminate to be used. These transparent conductive films are advantageously used for a multi-touch input device, which can be operated by touching it with two or more fingers at the same time. Specifically, a capacitance touch panel is designed to achieve sensing when the content of change in output signal, which is generated at a position where the touch panel is touched with a finger or the like, exceeds a certain threshold value.

PRIOR ART DOCUMENTS

Patent Documents

Patent Document 1: JP-A-2003-238915
Patent Document 2: JP-A-2003-342542
Patent Document 3: JP-A-2004-231723
Patent Document 4: JP-A-2002-363530
Patent Document 5: JP-A-2011-184582

SUMMARY OF THE INVENTION

Problems to be Solved by the Invention

As a member constituting the touch panel, for example, a cover glass or the like to which a printing has been applied is used, but a step is generated on the surface of the cover glass due to such a printing. Therefore, when the member having an surface with an printing step (ink step) and another member are bonded with a pressure-sensitive adhesive layer interposed therebetween, it is required that the pressure-sensitive adhesive layer absorbs such an ink step and follows the ink step without generating gaps between the members. As an index of the pressure-sensitive adhesive layer involved in the ink step, it should satisfy the followability to the ink step absorbability (%) expressed in terms of the ink step ($\mu$m) and the thickness ($\mu$m) of the pressure-sensitive adhesive layer: (ink step/thickness of pressure-sensitive adhesive layer)×100. About 30% has been demanded for the ink step absorbability. In order to absorb the ink step in general, it is considered to lower an elastic modulus, but a pressure-sensitive adhesive having a low elastic modulus is not enough in the reliability of durability and the like. In order to satisfy the reliability as well as the ink step absorbability, use of an ultraviolet-crosslinkable pressure-sensitive adhesive sheet as described in Patent Document 5 has been proposed. However, in recent years, there is a demand for the pressure-sensitive adhesive layer to be thinner and there is an advanced demand for the ink step absorbability to be 60 to 90%. Thus, the pressure-sensitive adhesive sheet according to Patent Document 5 has become difficult to satisfy a high ink step absorbability.

Further, as described above, the dielectric constant of a member, i.e., a film constituting a touch panel is an important numerical value involved in responsiveness of the touch panel. On the other hand, in recent years, with the spread of touch panels, higher performance is demanded thereon, and high performance is also demanded on a transparent conductive film and a pressure-sensitive adhesive layer which are constituent members for touch panels. One example for achieving this is to make such members thinner. However, there is a problem such that when the pressure-sensitive adhesive layer is simply made thinner, designed capacitance values would have changed. A lower dielectric constant of the pressure-sensitive adhesive layer is required so as to make the pressure-sensitive adhesive layer thinner without changing the numerical value of the capacitance value. In addition, for visibility improvement, there is a case where an air layer between the printed glass or film and an optical film, or an upper air layer of the LCD is filled with a pressure-sensitive adhesive layer in its interlayer, while there is a possibility that malfunction might occur if the dielectric constant of the pressure-sensitive adhesive layer is high. From the viewpoint of preventing such malfunction, lowering of the dielectric constant of the pressure-sensitive adhesive layer is required. In addition, an improvement in the response speed and sensitivity of touch panels is expected by lowering the dielectric constant of the pressure-sensitive adhesive layer.

Accordingly, an object of the present invention is to provide a pressure-sensitive adhesive capable of realizing a pressure-sensitive adhesive layer having satisfactory adhesion performance and a high absorbability of ink step. Further, another object of the present invention is to provide the pressure-sensitive adhesive capable of realizing a pressure-sensitive adhesive layer having satisfactory adhesion performance, a high absorbability of ink step, and a low dielectric constant.

In addition, a further object of the present invention is to provide a pressure-sensitive adhesive layer formed by the pressure-sensitive adhesive, and a pressure-sensitive adhesive sheet having the pressure-sensitive adhesive layer. A still further object of the present invention is to provide a laminate wherein a first member and a second member are bonded with the pressure-sensitive adhesive layer interposed therebetween in a good followable manner.

Means for Solving the Problems

As a result of intense investigations to solve the problems, the inventors have made the invention, based on the finding that the objects are achieved with a pressure-sensitive adhesive described below.

The invention relates to a radiation-curable pressure-sensitive adhesive, comprising a (meth)acryl-based polymer obtained by polymerizing a monomer component containing 30 to 90% by weight of an alkyl(meth)acrylate having an alkyl group of 10 to 22 carbon atoms at an ester end, and having a radically polymerizable functional group containing a carbon-carbon double bond. The alkyl group of the alkyl(meth)acrylate polymer having an alkyl group of 10 to 22 carbon atoms at an ester end is preferably a branched alkyl group.

In the radiation-curable pressure-sensitive adhesive, the monomer component preferably further contains 5 to 25% by weight of a cyclic nitrogen-containing monomer.

In the radiation-curable pressure-sensitive adhesive, the monomer component is preferably a monomer component further containing 1 to 20% by weight of at least one functional group-containing monomer selected from a carboxyl group-containing monomer, a hydroxyl group-containing monomer, and a cyclic ether group-containing monomer.

In the radiation-curable pressure-sensitive adhesive, the monomer component is preferably a monomer component further containing 0.5% by weight or more of at least one alkyl(meth)acrylate selected from an alkyl(meth)acrylate having an alkyl group of 1 to 9 carbon atoms at an ester end and an alkyl(meth)acrylate having a cyclic alkyl group at an ester end.

In one embodiment, the radiation-curable pressure-sensitive adhesive containing, in addition to the (meth)acryl-based polymer, a compound having at least one radically polymerizable functional group containing a carbon-carbon double bond in the molecule can be used. In one embodiment, the radiation-curable pressure-sensitive adhesive wherein the (meth)acryl-based polymer can be a (meth)acryl-based polymer having a radically polymerizable functional group containing a carbon-carbon double bond can be used.

The radiation-curable pressure-sensitive adhesive preferably further contains 0.005 to 5 parts by weight of a crosslinking agent based on 100 parts by weight of the (meth)acryl-based polymer.

The invention also relates to a radiation-curable pressure-sensitive adhesive layer, which is obtained from the radiation-curable pressure-sensitive adhesive.

In the radiation-curable pressure-sensitive adhesive layer, before radiation curing, a shear storage modulus at 70° C. is preferably $2.0 \times 10^3$ to $4.0 \times 10^4$ Pa and a gel fraction is preferably 0 to 60% by weight, and
after radiation curing, a shear storage modulus at 70° C. is preferably $1.5 \times 10^4$ to $1.5 \times 10^5$ Pa and a gel fraction is preferably 40 to 95% by weight.

In the radiation-curable pressure-sensitive adhesive layer, a relative dielectric constant at a frequency of 100 kHz is preferably 3.7 or less.

The invention also relates to a radiation-curable pressure-sensitive adhesive sheet, comprising a support and the radiation-curable pressure-sensitive adhesive layer formed on at least one side of the support.

The radiation-curable pressure-sensitive adhesive sheet can be used for a pressure-sensitive adhesive-type optical member comprising an optical member as a support.

The invention also relates to a laminate comprising a first member and a second member being bonded with the radiation-curable pressure-sensitive adhesive layer interposed therebetween.

In the laminate, at least one of the first member and the second member is a member having a surface with an ink step, and
the laminate is also suitable for a case where the ink step (μm) and the thickness (μm) of the pressure-sensitive adhesive layer satisfy the expression of (ink step/thickness of pressure-sensitive adhesive layer)≤0.9.

The laminate can be suitably applied when at least one of the first member and the second member is an optical member.

Effect of the Invention

The (meth)acryl-based polymer in the radiation-curable pressure-sensitive adhesive of the invention is a polymer obtained by polymerizing a monomer component with a predetermined content of an alkyl(meth)acrylate having a long-chain alkyl group of 10 to 22 carbon atoms. The radiation-curable pressure-sensitive adhesive layer formed from the radiation-curable pressure-sensitive adhesive of the invention has a good followability to the surface with the ink step before radiation curing because the layer has the long-chain alkyl group, thus making it possible to absorb the ink step without gaps by the pressure-sensitive adhesive layer so that a satisfactory high absorbability of ink step can be achieved. Further, the radiation-curable pressure-sensitive adhesive layer of the invention has a high ink step absorbability, and therefore it is not necessary to increase the thickness of the pressure-sensitive adhesive layer even when the ink step is large, and the radiation-curable pressure-sensitive adhesive layer of the invention is suitable from the viewpoint of thinning the pressure-sensitive adhesive layer. On the other hand, at the time of after radiation curing, the adhesion characteristics can be satisfied by the cured pressure-sensitive adhesive layer. In this way, according to the radiation-curable pressure-sensitive adhesive of the invention, it is possible to obtain a radiation-curable pressure-sensitive adhesive layer having satisfactory adhesion performance and a high absorbability of ink step.

In addition, according to the radiation-curable pressure-sensitive adhesive of the invention, it is possible to realize a pressure-sensitive adhesive layer having a low dielectric constant by the action of the long-chain alkyl group. Further, as described above, even when the air layer is filled with the pressure-sensitive adhesive layer in its interlayer, the radiation-curable pressure-sensitive adhesive layer can prevent malfunction because of its low dielectric constant.

It is considered that lowering of the dielectric constant can be performed by decreasing the dipole moment of the molecule and increasing the molar volume according to the expression of Clausius-Mossotti. It is considered that the dielectric constant of the alkyl(meth)acrylate related to the main monomer units constituting the main component (meth)acryl-based polymer in the radiation-curable pressure-sensitive adhesive of the invention is decreased because such an alkyl(meth)acrylate has a long-chain alkyl group. Such a radiation-curable pressure-sensitive adhesive layer with a higher molar volume and a lower dipole moment balanced with each other is considered to be achieved when an alkyl(meth)acrylate having an alkyl group of 10 to 22 carbon atoms at the ester end is used.

For example, the radiation-curable pressure-sensitive adhesive layer of the invention can have a relative dielectric constant as low as 3.7 or less at a frequency of 100 kHz. This feature makes it possible to design capacitance touch panels with no change in capacitance value even when the radiation-curable pressure-sensitive adhesive layer of the invention is reduced in thickness to form a transparent conductive film for use in capacitance touch panels.

Furthermore, in the case of using a cyclic nitrogen-containing monomer as the monomer units constituting the main component (meth)acryl-based polymer in the radiation-curable pressure-sensitive adhesive of the invention, a satisfactory moisture resistance reliability can be obtained by the action of cohesiveness and hydrophilicity in the cyclic structure with a nitrogen atom. Due to the satisfactory moisture resistance reliability, when a laminate obtained by laminating a transparent conductive film and glass with a pressure-sensitive adhesive layer interposed therebetween is exposed to humidified conditions, clouding of the pressure-sensitive adhesive layer can be suppressed.

MODE FOR CARRYING OUT THE INVENTION

Figure 1:
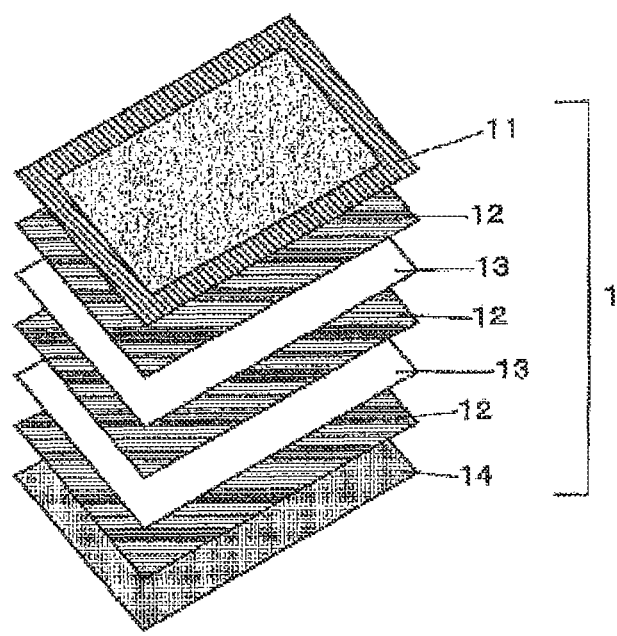
FIG. 1 is a view showing an example of a capacitance touch panel produced using the radiation-curable pressure-sensitive adhesive layer or the radiation-curable pressure-sensitive adhesive sheet of the invention.

The radiation-curable pressure-sensitive adhesive of the invention contains a (meth)acryl-based polymer obtained by polymerizing a monomer component containing 30 to 90% by weight of an alkyl(meth)acrylate having an alkyl group of 10 to 22 carbon atoms at an ester end, and has a radically polymerizable functional group containing a carbon-carbon double bond.

The radically polymerizable functional group containing a carbon-carbon double bond, contained in the radiation-curable pressure-sensitive adhesive, includes a radiation-curable functional group, and examples thereof include functional groups having an unsaturated double bond, such as a (meth)acryloyl group and a vinyl group. A compound having at least one radically polymerizable functional group containing a carbon-carbon double bond in the molecule may be blended with the (meth)acryl-based polymer that is a base polymer so that the radiation-curable pressure-sensitive adhesive may have a radically polymerizable functional group containing a carbon-carbon double bond. Alternatively, a (meth)acryl-based polymer having a radically polymerizable functional group containing a carbon-carbon double bond may be used as the (meth)acryl-based polymer that is a base polymer so that the radiation-curable pressure-sensitive adhesive may have a radically polymerizable functional group containing a carbon-carbon double bond. In addition, both means described above may be used so that the radiation-curable pressure-sensitive adhesive may have a radically polymerizable functional group containing a carbon-carbon double bond.

First, a radiation-curable pressure-sensitive adhesive (1) will be described in which a compound having at least one radically polymerizable functional group containing a carbon-carbon double bond in the molecule is blended with the (meth)acryl-based polymer.

The (meth)acryl-based polymer is obtained by polymerizing a monomer component containing 30 to 90% by weight of an alkyl(meth)acrylate having an alkyl group of 10 to 22 carbon atoms at the ester end. It should be noted that the alkyl(meth)acrylate refers to an alkyl acrylate and/or alkyl methacrylate, and the term "(meth)" is used as the same meaning in the invention.

When a homopolymer related to the alkyl(meth)acrylate having an alkyl group of 10 to 22 carbon atoms at the ester end is formed, a glass transition temperature (Tg) is preferably −80 to 0° C., more preferably −70 to −10° C., and furthermore preferably −60 to −10° C. If the Tg when forming a homopolymer is less than −80° C., the elastic modulus of the pressure-sensitive adhesive at normal temperature may be too lowered, and this is unfavorable. If the Tg exceeds 0° C., the adhering strength may be reduced and this is unfavorable. The Tg of the homopolymer is a value measured by temperature modulated DSC. The alkyl group preferably has 13 carbon atoms or more in view of satisfying ink step absorbability, low dielectric constant, and further adequate elastic modulus. The alkyl group has more preferably 14 to 22 carbon atoms and furthermore preferably 16 to 22 carbon atoms. It should be noted that even if the Tg of the homopolymer related to the alkyl(meth)acrylate is −80 to 0° C., the effects of the pressure-sensitive adhesive layer in ink step absorbability and lowering of dielectric constant are not large if the alkyl group has 9 carbon atoms or less.

The Tg of the homopolymer is a value measured by the following method. About 1 to 2 mg of a test sample is weighed into an aluminum open cell, and the reversing heat flow (specific heat component) behavior of the homopolymer is obtained by using temperature modulated DSC (trade name: "Q-2000", manufactured by TA Instruments Japan Inc.) at a temperature rising rate of 5° C./minute in a nitrogen atmosphere of 50 mL/minute. In accordance with JIS-K-7121, the temperature at the intersection point between the straight line equally separated in the vertical direction from the straight lines extending from the low temperature-sided base line and high temperature-sided base line of the reversing heat flow obtained and the curve in the stepwise change region of glass transition is determined as the glass transition temperature (Tg) when the homopolymer is formed.

The alkyl group of 10 to 22 carbon atoms in the alkyl (meth)acrylate may be linear or branched, but a branched alkyl group is more preferable than a linear alkyl group in view of the effects of the pressure-sensitive adhesive in ink step absorbability and lowering of dielectric constant. Since the long chain alkyl group of the alkyl(meth)acrylate has a branched alkyl group, it is considered that the molar volume is increased and the dipole moment is lowered to obtain a pressure-sensitive adhesive layer having a balance of both. Further, it is considered that since the alkyl group is branched, the entanglement molecular weight of the polymer is increased and the storage elastic modulus at high temperatures is decreased so that it possible to achieve a good ink step absorbability.

Examples of the alkyl(meth)acrylate having a linear alkyl group of 10 to 22 carbon atoms at the ester end include decyl acrylate (10 carbon atoms), undecyl acrylate (11 carbon atoms), dodecyl acrylate (lauryl acrylate) (12 carbon atoms), tridecyl acrylate (13 carbon atoms), tetradecyl acrylate (14 carbon atoms), pentadecyl acrylates (15 carbon atoms), hexadecyl acrylate (16 carbon atoms), heptadecyl acrylate (17 carbon atoms), octadecyl acrylate (18 carbon atoms), nonadecyl acrylate (19 carbon atoms), eicosyl acrylate (20 carbon atoms), heneicosyl acrylate (21 carbon atoms), docosyl acrylate (22 carbon atoms), and the methacrylate-based monomers exemplified above. These can be used alone or in combination of two or more. Of these, dodecyl acrylate and dodecyl methacrylate (lauryl methacrylate) (12 carbon atoms) are preferable.

Examples of the alkyl(meth)acrylate having a branched alkyl group of 10 to 22 carbon atoms at the ester end include isodecyl acrylate (10 carbon atoms, Tg of homopolymer (hereinafter referred to simply as Tg)=−60° C.), isodecyl methacrylate (10 carbon atoms, Tg=−41° C.), isomyristyl acrylate (14 carbon atoms, Tg=−56° C.), isostearyl acrylate (18 carbon atoms, Tg=−18° C.), 2-propylheptyl acrylate, isoundecyl acrylate, isododecyl acrylate, isotridecyl acrylate, isopentadecyl acrylate, isohexadecyl acrylate, isoheptadecyl acrylate, and methacrylate-based monomers of the acrylate-based monomers exemplified above. These can be used alone or in combination of two or more.

Of the branched alkyl group of 10 to 22 carbon atoms, those having a t-butyl group are preferable in consideration of particularly obtaining a pressure-sensitive adhesive with an increased molar volume, a lowered dipole moment, and a balance of both. An Example of the alkyl(meth)acrylate having a branched alkyl group of 10 to 22 carbon atoms, the alkyl group having t-butyl group, includes isostearyl acrylate represented by the following formula:

[Formula 1]

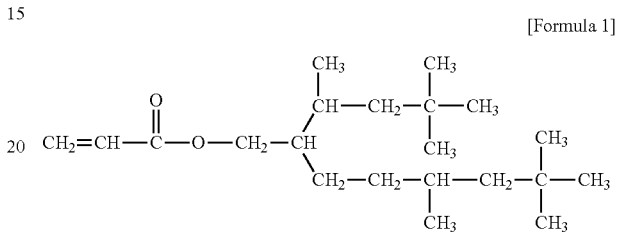

Also, as the alkyl(meth)acrylate having an alkyl group of 10 to 22 carbon atoms at the ester end, alkyl methacrylates are more preferable than alkyl acrylates in view of the effects of the pressure-sensitive adhesive layer in ink step absorbability and lowering of dielectric constant due to an increase in molar volume and a reduction in dipole moment. Even when the long chain alkyl group is a linear alkyl group in the alkyl methacrylate, it is considered that the alkyl methacrylate increases the molar volume and reduces the dipole moment, resulting in providing a pressure-sensitive adhesive layer having a balance of both.

The content of the alkyl(meth)acrylate having an alkyl group of 10 to 22 carbon atoms at the ester end is 30 to 90% by weight, preferably 30 to 80% by weight, more preferably 30 to 70% by weight, furthermore preferably 35 to 60% by weight, and especially preferably 40 to 60% by weight, based on the total weight of the monomer component used to form the (meth)acryl-based polymer. Use of 30% by weight or more of the alkyl(meth)acrylate is preferable in view of ink step absorbability and lowering of dielectric constant, and use of 90% by weight or less thereof is preferable in view of maintaining adhering strength.

A cyclic nitrogen-containing monomer can be used as the monomer component. As the cyclic nitrogen-containing monomer, any monomer having a cyclic nitrogen-containing structure and an unsaturated double bond-containing polymerizable functional group such as a (meth)acryloyl group or a vinyl group may be used without restriction. As the cyclic nitrogen-containing structure, those having a nitrogen atom in the ring structure are preferred. Examples of the cyclic nitrogen-containing monomer include lactam-based vinyl monomers (e.g., N-vinylpyrrolidone, N-vinyl-∈-caprolactam, methylvinylpyrrolidone, etc.); and vinyl-based monomers having nitrogen-containing heterocycles (e.g., vinylpyridine, vinylpiperidone, vinylpyrimidine, vinylpiperazine, vinylpyrazine, vinylpyrrole, vinylimidazole, vinyloxazole, vinylmorpholine, etc.). Examples thereof further include (meth)acrylic monomers containing heterocycles such as morpholine ring, piperidine ring, pyrrolidine ring, and piperazine ring, and specifically include N-acryloylmorpholine, N-acryloylpiperidine, N-methacryloylpiperidine, N-acryloylpyrrolidine, and the like. Among the cyclic nitrogen-containing monomers, lactam-based vinyl monomers are preferable in view of dielectric constant and cohesiveness.

The content of the cyclic nitrogen-containing monomer is preferably 5 to 25% by weight based on the total weight of the monomer component used to form the (meth)acryl-based polymer. The content thereof is more preferably 5 to 20% by weight and furthermore preferably 5 to 15% by weight. The content of 5% by weight or more of the monomer is preferable in view of the moisture resistance reliability, and the content of 25% by weight or less of the monomer is preferable in view of an improvement in adhering strength and ink step absorbability.

The monomer component used to form the (meth)acryl-based polymer according to the invention may further include at least one functional group-containing monomer selected from a carboxyl group-containing monomer, a hydroxyl group-containing monomer, and a cyclic ether group-containing monomer.

Any monomer having a carboxyl group and an unsaturated double bond-containing polymerizable functional group such as a (meth)acryloyl group or a vinyl group may be used without restriction as the carboxyl group-containing monomer. Examples of the carboxyl group-containing monomer include (meth)acrylic acid, carboxyethyl(meth)acrylate, carboxypentyl(meth)acrylate, itaconic acid, maleic acid, fumaric acid, crotonic acid, and isocrotonic acid. These may be used alone or in any combination. Itaconic acid or maleic acid can be used in the form of an anhydride. Among these, acrylic acid and methacrylic acid are preferred, and acrylic acid is particularly preferred. It is possible to optionally use a carboxyl group-containing monomer as the monomer component used in the production of the (meth)acryl-based polymer of the invention; however, it is not necessary to use a carboxyl group-containing monomer. A pressure-sensitive adhesive containing a (meth)acryl-based polymer obtained from a monomer component not containing a carboxyl group-containing monomer can form a pressure-sensitive adhesive layer that is reduced in metal corrosion due to the carboxyl group.

Any monomer having a hydroxyl group and an unsaturated double bond-containing polymerizable functional group such as a (meth)acryloyl group or a vinyl group may be used without restriction as the hydroxyl group-containing monomer. Examples of the hydroxyl group-containing monomer include hydroxyalkyl(meth)acrylate such as 2-hydroxyethyl(meth)acrylate, 2-hydroxypropyl(meth)acrylate, 2-hydroxybutyl(meth)acrylate, 3-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, or 12-hydroxylauryl(meth)acrylate; and hydroxyalkylcycloalkane(meth)acrylate such as (4-hydroxymethylcyclohexyl)methyl(meth)acrylate. Other examples include hydroxyethyl(meth)acrylamide, allyl alcohol, 2-hydroxyethyl vinyl ether, 4-hydroxybutyl vinyl ether, and diethylene glycol monovinyl ether. These may be used alone or in any combination. Among them, hydroxyalkyl(meth)acrylate is preferred.

Any monomer having a cyclic ether group such as an epoxy group or an oxetane group and an unsaturated double bond-containing polymerizable functional group such as a (meth)acryloyl group or a vinyl group may be used without restriction as the cyclic ether group-containing monomer. Examples of the epoxy group-containing monomer include glycidyl(meth)acrylate, 3,4-epoxycyclohexylmethyl(meth)acrylate, and 4-hydroxybutyl(meth)acrylate glycidyl ether. Examples of the oxetane group-containing monomer include 3-oxetanylmethyl(meth)acrylate, 3-methyl-oxetanylmethyl(meth)acrylate, 3-ethyl-oxetanylmethyl(meth)acrylate, 3-butyl-oxetanylmethyl(meth)acrylate, and 3-hexyl-oxetanylmethyl(meth)acrylate. These monomers may be used alone or in any combination.

In the invention, the content of the functional group-containing monomer is preferably from 1 to 20% by weight, based on the total weight of the monomer component used to form the (meth)acryl-based polymer. The content of the functional group-containing monomer is preferably 1% by weight or more, more preferably 4% by weight or more so that adhesive strength and cohesive strength can be increased. If the content of the functional group-containing monomer is too high, a hard pressure-sensitive adhesive layer with a lower adhesive strength may be formed, and the pressure-sensitive adhesive may have too high a viscosity or may form a gel. Thus, the content of the functional group-containing monomer is preferably 20% by weight or less, more preferably 15% by weight or less, furthermore preferably 12% by weight or less, based on the total weight of the monomer component used to form the (meth)acryl-based polymer.

The monomer component used to form the (meth)acryl-based polymer may further include a copolymerizable monomer other than the cyclic nitrogen-containing monomer and the functional group-containing monomer. For example, a copolymerizable monomer other than those described above may be an alkyl(meth)acrylate represented by the formula $CH_2=C(R^1)COOR^2$, wherein $R^1$ represents hydrogen or a methyl group, and $R^2$ represents a substituted or unsubstituted alkyl group of 1 to 9 carbon atoms.

The substituted or unsubstituted alkyl group of 1 to 9 carbon atoms represented by $R^2$ may be a linear or branched alkyl group or cycloalkyl group. Specifically, $R^2$ represents a branched alkyl of group of 3 to 7 carbon atoms or cycloalkyl group. The substituted alkyl group preferably has an aryl group of 3 to 8 carbon atoms or an aryloxy group of 3 to 8 carbon atoms as a substituent. The aryl group is preferably, but not limited to, a phenyl group. Concerning this alkyl(meth)acrylate, the alkyl methacrylate is more preferred than the alkyl acrylate in order to lower dielectric constant by increasing molar volume and reducing dipole moment.

Examples of the monomer represented by $CH_2=C(R^1)COOR^2$ include methyl(meth)acrylate, ethyl(meth)acrylate, n-butyl(meth)acrylate, sec-butyl(meth)acrylate, tert-butyl(meth)acrylate, isobutyl(meth)acrylate, n-pentyl(meth)acrylate, isopentyl(meth)acrylate, hexyl(meth)acrylate, heptyl(meth)acrylate, isoamyl(meth)acrylate, 2-ethylhexyl(meth)acrylate, n-octyl(meth)acrylate, isooctyl(meth)acrylate, n-nonyl(meth)acrylate, isononyl(meth)acrylate, phenoxyethyl(meth)acrylate, benzyl(meth)acrylate, cyclohexyl(meth)acrylate, 3,3,5-trimethylcyclohexyl(meth)acrylate, and isobornyl(meth)acrylate. These monomers may be used alone or in any combination.

In the invention, the content of the (meth)acrylate represented by $CH_2=C(R^1)COOR^2$ may be 70% by weight or less, preferably 65% by weight or less, based on the total weight of the monomer component used to form the (meth)acryl-based polymer. The (meth)acrylate represented by $CH_2=C(R^1)COOR^2$ is used preferably in a content of 5% by weight or more and more preferably in a content of 10% by weight or more in view of maintaining the adhering strength.

Other copolymerizable monomers that may also be used include vinyl monomers such as vinyl acetate, vinyl propionate; styrene, α-methylstyrene; glycol acrylic ester monomers such as polyethylene glycol(meth)acrylate, polypropylene glycol(meth)acrylate, methoxyethylene glycol(meth) acrylate, and methoxypolypropylene glycol(meth)acrylate; and acrylate ester monomers such as tetrahydrofurfuryl (meth)acrylate, fluoro(meth)acrylate, silicone(meth)acrylate, and 2-methoxyethyl acrylate; amide group-containing monomers, amino group-containing monomers, imide group-containing monomers, N-acryloyl morpholine, and vinyl ether monomers. Cyclic structure-containing monomers such as terpene(meth)acrylate and dicyclopentanyl (meth)acrylate may also be used as copolymerizable monomers.

Besides the above, a silicon atom-containing silane monomer may be exemplified as the copolymerizable monomer. Examples of the silane monomers include 3-acryloxypropyltriethoxysilane, vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, and 10-acryloyloxydecyltriethoxysilane.

The monomer component monomer component used to form the (meth)acryl-based polymer of the invention may contain a polyfunctional monomer as needed in addition to the monofunctional monomer exemplified above, in order to adjust the cohesive strength of the pressure-sensitive adhesive.

The polyfunctional monomer is a monomer having at least two unsaturated double bond-containing polymerizable functional groups such as (meth)acryloyl group or vinyl group, and examples thereof include ester compounds of a polyhydric alcohol with (meth)acrylic acid (e.g., (poly) ethylene glycol di(meth)acrylate, (poly)propylene glycol di(meth)acrylate, (poly)tetramethylene glycol di(meth)acrylate, neopentyl glycol di(meth)acrylate, pentaerythritol di(meth)acrylate, pentaerythritol tri(meth)acrylate, pentaerythritol tetra(meth)acrylate, dipentaerythritol hexa(meth)acrylate, 1,2-ethyleneglycol di(meth)acrylate, 1,6-hexanediol di(meth)acrylate, 1,12-dodecanediol di(meth) acrylate, trimethylolpropane tri(meth)acrylate, tetramethylolmethane tri(meth)acrylate, ethoxylated bisphenol A di(meth)acrylate, ethoxylated pentaerythritol tetra (meth)acrylate, etc.; allyl(meth)acrylate, vinyl(meth)acrylate, divinylbenzene, epoxy acrylate, polyester acrylate, urethane acrylate, butanediol di(meth)acrylate, hexanediol di(meth)acrylate, and the like. Of them, trimethylolpropane tri(meth)acrylate, hexanediol di(meth)acrylate, and dipentaerythritol hexa(meth)acrylate can be preferably used. The polyfunctional monomer can be used alone or in combination of two or more.

The content of the polyfunctional monomer differs depending on the molecular weight or number of functional groups of the monomer, but the polyfunctional monomer can be added in an content of 3% by weight or less, preferably 2% by weight or less, and more preferably 1% by weight or less, based on the total weight of the monomer component used to form the (meth)acryl-based polymer. If the content of the polyfunctional monomer used exceeds 3% by weight, for example, there may be cases where cohesive strength of the pressure-sensitive adhesive becomes higher too much and as a result, the adhesive strength is reduced.

Further, the monomer component used in the invention may also include optional components other than the above, but, in that case, the content is preferably 10% by weight or less based on the total weight of the monomer component used to form the (meth)acryl-based polymer.

For the production of the (meth)acrylic polymer, any appropriate method may be selected from known production methods such as solution polymerization, bulk polymerization, emulsion polymerization, and various radical polymerization methods. The resulting (meth)acrylic polymer may be any type of copolymer such as a random copolymer, a block copolymer and a graft copolymer.

Any appropriate polymerization initiator, chain transfer agent, emulsifying agent and so on may be selected and used for radical polymerization. The weight average molecular weight of the (meth)acryl-based polymer may be controlled by the reaction conditions including the amount of addition of the polymerization initiator or the chain transfer agent. The content of the addition may be controlled as appropriate depending on the type of these materials.

In a solution polymerization process, for example, ethyl acetate, toluene or the like is used as a polymerization solvent. Ina specific solution polymerization process, for example, the reaction is performed under a stream of inert gas such as nitrogen at a temperature of about 50 to about 70° C. for about 5 to about 30 hours in the presence of a polymerization initiator.

Examples of the thermal polymerization initiator used for the solution polymerization process include, but are not limited to, azo initiators such as 2,2'-azobisisobutyronitrile, 2,2'-azobis-2-methylbutyronitrile, 2,2'-azobis(2-methylpropionic acid)dimethyl, 4,4'-azobis-4-cyanovaleric acid, azobisisovaleronitrile, 2,2'-azobis(2-amidinopropane)dihydrochloride, 2,2'-azobis[2-(5-methyl-2-imidazoline-2-yl) propane]dihydrochloride, 2,2'-azobis(2-methylpropionamidine)disulfate, 2,2'-azobis(N,N'-dimethyleneisobutylamidine), and 2,2'-azobis[N-(2-carboxyethyl)-2-methylpropionamidine]hydrate (VA-057, manufactured by Wako Pure Chemical Industries, Ltd.); persulfates such as potassium persulfate and ammonium persulfate; peroxide initiators such as di(2-ethylhexyl)peroxydicarbonate, di(4-tert-butylcyclohexyl)peroxydicarbonate, di-sec-butylperoxydicarbonate, tert-butylperoxyneodecanoate, tert-hexylperoxypivalate, tert-butylperoxypivalate, dilauroyl peroxide, di-n-octanoyl peroxide, 1,1,3,3-tetramethylbutylperoxy-2-ethyl hexanoate, di(4-methylbenzoyl) peroxide, dibenzoyl peroxide, tert-butylperoxyisobutylate, 1,1-di(tert-hexylperoxy)cyclohexane, tert-butylhydroperoxide, and hydrogen peroxide; and redox system initiators of a combination of a peroxide and a reducing agent, such as a combination of a persulfate and sodium hydrogen sulfite and a combination of a peroxide and sodium ascorbate.

One of the above polymerization initiators may be used alone, or two or more thereof may be used in a mixture. The total content of the polymerization initiator is preferably from about 0.005 to 1 part by weight, more preferably from about 0.02 to about 0.5 parts by weight, based on 100 parts by total weight of the monomer component.

For example, when 2,2'-azobisisobutyronitrile is used as a polymerization initiator for the production of the (meth) acrylic polymer with the above weight average molecular weight, the polymerization initiator is preferably used in a content of from about 0.06 to 0.2 parts by weight, more preferably of from about 0.08 to 0.175 parts by weight, based on 100 parts by total weight of the monomer component.

Examples of the chain transfer agent include lauryl mercaptan, glycidyl mercaptan, mercaptoacetic acid, 2-mercaptoethanol, thioglycolic acid, methy thioglycolate, ethyl thioglycolate, 2-ethylhexyl thioglycolate, α-thioglycerol and 2,3-dimercapto-1-propanol. One of these chain transfer agents may be used alone, or two or more thereof may be used in a mixture. The total content of the chain transfer agent is preferably about 0.1 parts by weight or less, based on 100 parts by total weight of the monomer component.

Examples of the emulsifier used in emulsion polymerization include anionic emulsifiers such as sodium lauryl sulfate, ammonium lauryl sulfate, sodium dodecylbenzenesulfonate, ammonium polyoxyethylene alkyl ether sulfate, and sodium polyoxyethylene alkyl phenyl ether sulfate; and nonionic emulsifiers such as polyoxyethylene alkyl ether, polyoxyethylene alkyl phenyl ether, polyoxyethylene fatty acid ester, and polyoxyethylene-polyoxypropylene block polymers. These emulsifiers may be used alone, or two or more thereof may be used in combination.

The emulsifier may be a reactive emulsifier. Examples of such an emulsifier having an introduced radical-polymerizable functional group containing a carbon-carbon double bond such as a propenyl group and an allyl ether group include AQUALON HS-10, HS-20, KH-10, BC-05, BC-10, and BC-20 (each manufactured by Dai-ichi Kogyo Seiyaku Co., Ltd.) and ADEKA REASOAP SE10N (manufactured by ADEKA COORPORATION). The reactive emulsifier is preferred, because after polymerization, it can be incorporated into a polymer chain to improve water resistance. Based on 100 parts by total weight of the monomer component, the emulsifier is preferably used in a content of 5 parts by weight or less, more preferably of 0.3 to 5 parts by weight, furthermore preferably of 0.5 to 1 part by weight, in view of polymerization stability or mechanical stability.

In the invention, the (meth)acryl-based polymer preferably has a weight average molecular weight of 400,000 to 2,500,000, more preferably 500,000 to 2,200,000. When the weight average molecular weight is more than 400,000, the pressure-sensitive adhesive layer can have satisfactory durability and can have a cohesive strength small enough to suppress adhesive residue. On the other hand, if the weight average molecular weight is more than 2,500,000, bonding ability or adhesive strength may tend to be lower. In this case, the pressure-sensitive adhesive may form a solution with too high a viscosity, which may be difficult to apply. As used herein, the term "weight average molecular weight" refers to a polystyrene-equivalent weight average molecular weight, which is determined using gel permeation chromatography (GPC).

<Measurement of Weight Average Molecular Weight>

The weight average molecular weight of the obtained (meth)acryl-based polymer was measured by GPC (gel permeation chromatography) as follows. The polymer sample was dissolved in tetrahydrofuran to form a 0.1% by weight solution. After allowed to stand overnight, the solution was filtered through a 0.45 μm membrane filter, and the filtrate was used for the measurement.

Analyzer: HLC-8120GPC manufactured by TOSOH CORPORATION
Column: TSK gel GMH-H(S)
Column size: 7.8 mmϕ×30 cm
Eluent: tetrahydrofuran (concentration 0.1% by weight)
Flow rate: 0.5 ml/minute
Detector: differential refractometer (RI)
Column temperature: 40° C.
Injection volume: 100 μl
Eluent: tetrahydrofuran
Detector: differential refractometer
Standard sample: polystyrene In the radiation-curable pressure-sensitive adhesive (1), examples of the compound having at least one radically polymerizable functional group containing a carbon-carbon double bond in the molecule include a monomer component and an oligomer component, each having a radically polymerizable functional group containing a radiation-curable carbon-carbon double bond.

Examples of the compound having one radically polymerizable functional group containing a carbon-carbon double bond in the molecule include various monofunctional monomers listed above related to the (meth)acryl-based polymer. In addition, examples of the compound having at least two radically polymerizable functional groups in the molecule include the compounds exemplified as the polyfunctional monomer described above. Examples of the radiation-curable oligomer component include various oligomers, such as urethane-based, polyether-based, polyester-based, polycarbonate-based, and polybutadiene-based oligomers. As the radiation-curable monomer component or oligomer component having a radically polymerizable functional group containing a carbon-carbon double bond, those having a molecular weight in the range of about 100 to about 30000 are suitable. The compound having at least two radically polymerizable functional groups containing a carbon-carbon double bond in the molecule is preferable as the radiation-curable monomer component or oligomer component in view of ink step absorbability.

The content of the compound having at least one radically polymerizable functional group containing a carbon-carbon double bond in the molecule is preferably about 1 to about 50 parts by weight, more preferably 5 to 40 parts by weight, and furthermore preferably 7 to 30 parts by weight, based on 100 parts by weight of the (meth)acryl-based polymer.

Hereinbelow, a radiation-curable pressure-sensitive adhesive (2) using a (meth)acryl-based polymer having a radically polymerizable functional group containing a carbon-carbon double bond as the (meth)acryl-based polymer will be described. The side chain or main chain or at the end of the main chain of the (meth)acryl-based polymer can contain the radically polymerizable functional group containing a carbon-carbon double bond. The radiation-curable pressure-sensitive adhesive (2) does not need to contain a radiation-curable monomer component or oligomer component that is a low molecular weight component, in addition to the (meth)acryl-based polymer, nor does contain such components in a large amount, and therefore, it is possible to form a pressure-sensitive adhesive layer having a stable layer structure without transfer of low molecular weight components or the like in the pressure-sensitive adhesive with time.

Examples of the (meth)acryl-based polymer having a radically polymerizable functional group containing a carbon-carbon double bond include those obtained by introducing a radically polymerizable functional group containing a carbon-carbon double bond into the (meth)acryl-based polymer as a basic skeleton, as described in the radiation-curable pressure-sensitive adhesive (1). A method of introducing a radically polymerizable functional group containing a carbon-carbon double bond is not particularly limited and various methods may be adopted. However, introduction of the radically polymerizable functional group containing a carbon-carbon double bond into side chains of the (meth)acryl-based polymer is easily performed from the viewpoint of molecular design. For example, a (meth)acryl-based polymer is preliminary copolymerized with a monomer having a functional group (a) and then the resultant copolymer is condensed with or subjected to an addition reaction with a compound having a functional group (b) reactive with the functional group (a) and a radically polymerizable functional group containing a carbon-carbon double bond, in such a manner that the radiation curability of the radically polymerizable functional group containing a carbon-carbon double bond is maintained.

Examples of the combination of the functional groups (a) and (b) include a carboxyl group and an epoxy group; a carboxyl group and an aziridyl group; a hydroxyl group and an isocyanate group; and the like. Of the combinations of these functional groups, the combination of a hydroxyl group and an isocyanate group is preferable. In the combinations of these functional groups (a) and (b), such functional groups may be present on any side of the (meth)acryl-based polymer and the compound If the combination forms the (meth)acryl-based polymer having a radically polymerizable functional group containing a carbon-carbon double bond. For example, in the case of the combination of a hydroxyl group and an isocyanate group, it is preferable that the (meth)acryl-based polymer has a hydroxyl group and the compound has an isocyanate group. In this case, examples of the isocyanate compound having a radically polymerizable functional group containing a carbon-carbon double bond include methacryloyl isocyanate, 2-methacryloyloxyethyl isocyanate, 2-acryloyloxyethyl isocyanate, m-isopropenyl-α, α-dimethylbenzyl isocyanate, and the like. In addition, as the acrylic-based polymer, those obtained by copolymerization of the hydroxyl group-containing monomer listed above are used. In the (meth)acryl-based polymer having a radically polymerizable functional group containing a carbon-carbon double bond, with respect to the ratio (introduction amount) of the radically polymerizable functional group, it is preferable that the ratio of the compound having a radically polymerizable functional group is within the range of 0.1 to 10 parts by weight based on 100 parts by weight of the (meth)acryl-based polymer before the introduction of the radically polymerizable functional group.

In the radiation-curable pressure-sensitive adhesive (2), the (meth)acryl-based polymer having a radically polymerizable functional group containing a carbon-carbon double bond may be used alone, but the compound having at least one radically polymerizable functional group containing a carbon-carbon double bond in the molecule, which is used in the radically curable pressure-sensitive adhesive (1), may be added. It is preferred that the compound having at least one radically polymerizable functional group containing a carbon-carbon double bond in the molecule is used usually in the range of 0 to 30 parts by weight, preferably 0 to 20 parts by weight, and more preferably 0 to 10 parts by weight, based on 100 parts by weight of the (meth)acryl-based polymer having a radically polymerizable functional group containing a carbon-carbon double bond.

Although a pressure-sensitive adhesive layer is formed from the radiation-curable pressure-sensitive adhesive of the invention, the pressure-sensitive adhesive layer can be cured by radiation irradiation with electron beam, UV, etc. after bonding it to an adhered. When the radiation polymerization is carried out with an electron beam, it is not particularly necessary to allow the radiation-curable pressure-sensitive adhesive to contain a photopolymerization initiator, but when the radiation polymerization is carried out by UV polymerization, a photopolymerization initiator may be contained in the radiation-curable pressure-sensitive adhesive. The photopolymerization initiator may be used alone or in combination of two or more.

The photopolymerization initiator is not particularly limited as long as it can initiate photopolymerization, and photopolymerization initiators that are usually used can be employed. Examples thereof that can be used include benzoin ether-based photopolymerization initiator, acetophenone-based photopolymerization initiator, α-ketol-based photopolymerization initiator, aromatic sulfonyl chloride-based photopolymerization initiator, photoactive oxime-based photopolymerization initiator, benzoin-based photopolymerization initiator, benzyl-based photopolymerization initiator, benzophenone-based photopolymerization initiator, ketal-based photopolymerization initiator, thioxanthone-based photopolymerization initiator, acylphosphine oxide-based photopolymerization initiator, and the like.

Specific examples of the benzoin ether-based photopolymerization initiator include benzoin methyl ether, benzoin ethyl ether, benzoin propyl ether, benzoin isopropyl ether, benzoin isobutyl ether, 2,2-dimethoxy-1,2-diphenylethan-1-one [trade name: IRGACURE 651, manufactured by BASF], anisoin methyl ether, and the like. Examples of the acetophenone-based photopolymerization initiator include 1-hydroxycyclohexyl phenyl ketone [trade name: IRGACURE 184, manufactured by BASF], 4-phenoxydichloroacetophenone, 4-t-butyl-dichloroacetophenone, 1-[4-(2-hydroxyethoxy)-phenyl]-2-hydroxy-2-methyl-1-propan-1-one [trade name: IRGACURE 2959, manufactured by BASF], 2-hydroxy-2-methyl-1-phenyl-propan-1-one [trade name: DAROCUR 1173, manufactured by BASF], methoxyacetophenone, and the like. Examples of the α-ketol-based photopolymerization initiator include 2-methyl-2-hydroxypropiophenone, 1-[4-(2-hydroxyethyl)-phenyl]-2-hydroxy-2-methylpropan-1-one, and the like. Examples of the aromatic sulfonyl chloride-based photopolymerization initiator include 2-naphthalene sulfonyl chloride and the like. Examples of the photoactive oxime-based photopolymerization initiator include 1-phenyl-1,2-propanedione-2-(O-ethoxycarbonyl)-oxime, and the like.

Examples of the benzoin-based photopolymerization initiator include benzoin and the like. Examples of the benzyl-based photopolymerization initiator include benzyl and the like. Examples of the benzophenone-based photopolymerization initiators include benzophenone, benzoylbenzoic acid, 3,3'-dimethyl-4-methoxybenzophenone, polyvinyl benzophenone, α-hydroxycyclohexyl phenyl ketone, and the like. Examples of the ketal-based photopolymerization initiator include benzyl dimethyl ketal and the like. Examples of the thioxanthone-based photopolymerization initiator include thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, isopropylthioxanthone, 2,4-diisopropylthioxanthone, dodecylthioxanthone and the like.

Examples of the acylphosphine oxide-based photopolymerization initiator include bis(2,6-dimethoxybenzoyl)phenylphosphine oxide, bis(2,6-dimethoxybenzoyl)(2,4,4-trimethylpentyl)phosphine oxide, bis(2,6-dimethoxybenzoyl)-n-butylphosphine oxide, bis(2,6-dimethoxybenzoyl)-(2-methylpropan-1-yl)phosphine oxide, bis(2,6-dimethoxybenzoyl)-(1-methylpropan-1-yl)phosphine oxide, bis(2,6-dimethoxybenzoyl)-t-butylphosphine oxide, bis(2,6-dimethoxybenzoyl)cyclohexylphosphine oxide, bis(2,6-dimethoxybenzoyl)octylphosphine oxide, bis(2-methoxybenzoyl)(2-methylpropan-1-yl)phosphine oxide, bis(2-methoxybenzoyl)(1-methylpropan-1-yl)phosphine oxide, bis(2,6-diethoxybenzoyl)(2-methylpropan-1-yl)phosphine oxide, bis(2,6-diethoxybenzoyl)(1-methylpropan-1-yl)phosphine oxide, bis(2,6-dibutoxybenzoyl)(2-methylpropan-1-yl)phosphine oxide, bis(2,4-dimethoxybenzoyl)(2-methylpropan-1-yl)phosphine oxide, bis(2,4,6-trimethylbenzoyl)(2,4-dipentoxyphenyl)phosphine oxide, bis(2,6-dimethoxybenzoyl)benzylphosphine oxide, bis(2,6-dimethoxybenzoyl)-2-phenylpropylphosphine oxide, bis(2, 6-dimethoxybenzoyl)-2-phenylethylphosphine oxide, bis(2,6-dimethoxybenzoyl)benzylphosphine oxide, bis(2,6-dimethoxybenzoyl)-2-phenylpropylphosphine oxide, bis(2,6-dimethoxybenzoyl)-2-phenylethylphosphine oxide, 2,6-dimethoxybenzoyl benzylbutylphosphine oxide, 2,6-dimethoxybenzoyl benzyloctylphosphine oxide, bis(2,4,6-trimethylbenzoyl)-2,5-diisopropylphenylphosphine oxide, bis(2,4,6-trimethylbenzoyl)-2-methylphenylphosphine oxide, bis(2,4,6-trimethylbenzoyl)-4-methylphenylphosphine oxide, bis(2,4,6-trimethylbenzoyl)-2,5-diethylphenylphosphine oxide, bis(2,4,6-trimethylbenzoyl)-2,3,5,6-tetramethylphenylphosphine oxide, bis(2,4,6-trimethylbenzoyl)-2,4-di-n-butoxyphenylphosphine oxide, 2,4,6-trimethylbenzoyl diphenylphosphine oxide, bis(2,6-dimethoxybenzoyl)-2,4,4-trimethylpentylphosphine oxide, bis(2,4,6-trimethylbenzoyl)isobutylphosphine oxide, 2,6-dimethoxybenzoyl-2,4,6-trimethylbenzoyl-n-butylphosphine oxide, bis(2,4,6-trimethylbenzoyl)phenylphosphine oxide, bis(2,4,6-trimethylbenzoyl)-2,4-dibutoxyphenylphosphine oxide, 1,10-bis[bis(2,4,6-trimethylbenzoyl)phosphine oxide]decane, tri(2-methylbenzoyl)phosphine oxide, and the like.

The content of the polymerization initiator used is not particularly limited, but even in the case of the radiation-curable pressure-sensitive adhesives (1) and (2), it is 0.01 to 5 parts by weight, preferably 0.05 to 3 parts by weight, more preferably 0.05 to 1.5 parts by weight, and furthermore preferably 0.1 to 1 part by weight, based on 100 parts by weight of the (meth)acryl-based polymer.

If the content of the photopolymerization initiator used is below 0.01 parts by weight, there may be cases where the curing reaction is insufficient. If the content of the photopolymerization initiator used exceeds 5 parts by weight, the ultraviolet ray may not reach the inside of the pressure-sensitive adhesive layer because of UV absorption by the photopolymerization initiator. In this case, the curing reaction is decreased to cause a reduction in cohesive strength of the formed pressure-sensitive adhesive layer. Thus, there may be cases where when the pressure-sensitive adhesive layer is peeled off from the adherend, part of the pressure-sensitive adhesive layer remains in the adherend and accordingly such an adherend cannot be reused.

The radiation-curable pressure-sensitive adhesive of the invention may contain a crosslinking agent. Examples of the crosslinking agents include an isocyanate crosslinking agent, an epoxy crosslinking agent, a silicone crosslinking agent, an oxazoline crosslinking agent, an aziridine crosslinking agent, a silane crosslinking agent, an alkyl etherified melamine crosslinking agent, and a metallic chelate crosslinking agent. Such crosslinking agents may be used alone or in combination of two or more. An isocyanate crosslinking agent or an epoxy crosslinking agent is preferably used as the crosslinking agent.

These crosslinking agents may be used alone or in a mixture of two or more. The total content of the crosslinking agent(s) is preferably in the range of 0.005 to 5 parts by weight based on 100 parts by weight of the (meth)acryl-based polymer. The content of the crosslinking agent(s) is more preferably from 0.005 to 4 parts by weight, even more preferably from 0.01 to 3 parts by weight.

The term "isocyanate crosslinking agent" refers to a compound having two or more isocyanate groups (which may include functional groups that are temporarily protected with an isocyanate blocking agent or by oligomerization and are convertible to isocyanate groups) per molecule.

Isocyanate crosslinking agents include aromatic isocyanates such as tolylene diisocyanate and xylene diisocyanate, alicyclic isocyanates such as isophorone diisocyanate, and aliphatic isocyanates such as hexamethylene diisocyanate.

More specifically, examples of isocyanate crosslinking agents include lower aliphatic polyisocyanates such as butylene diisocyanate and hexamethylene diisocyanate; alicyclic isocyanates such as cyclopentylene diisocyanate, cyclohexylene diisocyanate, and isophorone diisocyanate; aromatic diisocyanates such as 2,4-tolylene diisocyanate, 4,4'-diphenylmethane diisocyanate, xylylene diisocyanate, and polymethylene polyphenyl isocyanate; isocyanate adducts such as a trimethylolpropane-tolylene diisocyanate trimer adduct (trade name: CORONATE L, manufactured by NIPPON POLYURETHANE INDUSTRY CO., LTD.), a trimethylolpropane-hexamethylene diisocyanate trimer adduct (trade name: CORONATE HL, manufactured by NIPPON POLYURETHANE INDUSTRY CO., LTD.), and an isocyanurate of hexamethylene diisocyanate (trade name: CORONATE HX, manufactured by NIPPON POLYURETHANE INDUSTRY CO., LTD.); a trimethylolpropane adduct of xylylene diisocyanate (trade name: D110N, manufactured by Mitsui Chemicals, Inc.) and a trimethylolpropane adduct of hexamethylene diisocyanate (trade name: D160N, manufactured by Mitsui Chemicals, Inc.); polyether polyisocyanate and polyester polyisocyanate; adducts thereof with various polyols; and polyisocyanates polyfunctionalized with an isocyanurate bond, a biuret bond, an allophanate bond, or the like. In particular, aliphatic isocyanates are preferably used because of their high reaction speed.

These isocyanate crosslinking agents may be used alone or in a mixture of two or more. The total content of the isocyanate crosslinking agent(s) is preferably from 0.005 to parts by weight, more preferably from 0.005 to 4 parts by weight, even more preferably from 0.01 to 3 parts by weight, based on 100 parts by weight of the (meth)acryl-based polymer. The content may be appropriately determined taking into account cohesive strength, the ability to prevent delamination in a durability test, or other properties.

When an aqueous dispersion of a modified (meth)acryl-based polymer produced by emulsion polymerization is used, the isocyanate crosslinking agent does not have to be used. If necessary, however, a blocked isocyanate crosslinking agent may also be used in such a case, because the isocyanate crosslinking agent itself can easily react with water.

The term "epoxy crosslinking agent" refers to a polyfunctional epoxy compound having two or more epoxy groups per molecule. Examples of the epoxy crosslinking agent include bisphenol A, epichlorohydrin-type epoxy resin, ethylene glycol diglycidyl ether, N,N,N',N'-tetraglycidyl-m-xylenediamine, diglycidylaniline, N,N-diamino glycidyl amine, 1,3-bis(N,N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, glycerine diglycidyl ether, glycerine triglycidyl ether, polyglycerol polyglycidyl ether, sorbitan polyglycidyl ether, trimethylolpropane polyglycidyl ether, diglycidyl adipate, diglycidyl o-phthalate, triglycidyl tris(2-hydroxyethyl) isocyanurate, resorcin diglycidyl ether, bisphenol-S-diglycidyl ether, and epoxy resins having two or more epoxy groups in the molecule. The epoxy crosslinking agent may also be a commercially available product such as TETRAD-C (trade name) or TETRAD-X (trade name) manufactured by MITSUBISHI GAS CHEMICAL COMPANY, INC.

These epoxy crosslinking agents may be used alone or in a mixture of two or more. The total content of the epoxy crosslinking agent(s) is preferably from 0.005 to 5 parts by weight, more preferably from 0.01 to 4 parts by weight, even more preferably from 0.01 to 3 parts by weight, based on 100 parts by weight of the (meth)acryl-based polymer. The content may be appropriately determined taking into account cohesive strength, the ability to prevent delamination in a durability test, or other properties.

As the crosslinking agent, a polyfunctional metal chelate may also be used in combination with an organic crosslinking agent. Examples of the polyfunctional metal chelate may include a polyvalent metal and an organic compound that is covalently or coordinately bonded to the metal. Examples of the polyvalent metal atom include Al, Cr, Zr, Co, Cu, Fe, Ni, V, Zn, In, Ca, Mg, Mn, Y, Ce, Sr, Ba, Mo, La, Sn, and Ti. The organic compound has a covalent or coordinate bond-forming atom such as an oxygen atom. Examples of the organic compound include alkyl esters, alcohol compounds, carboxylic acid compounds, ether compounds, and ketone compounds.

The radiation-curable pressure-sensitive adhesive of the invention may contain a (meth)acryl-based oligomer for improving adhesive strength. The (meth)acryl-based oligomer is preferably a polymer having a Tg higher than that of the (meth)acryl-based polymer according to the invention and having a weight average molecular weight lower than that of the (meth)acryl-based polymer according to the invention. Such a (meth)acryl-based oligomer functions as a tackifying resin and is advantageous in increasing adhesive strength without raising dielectric constant.

The (meth)acryl-based oligomer may preferably have a Tg of about 0° C. to 300° C., more preferably about 20° C. to 300° C., even more preferably about 40° C. to 300° C. If the Tg is lower than 0° C., the cohesive strength of the pressure-sensitive adhesive layer may decrease at room temperature or higher so that holding performance or tackiness at high temperature may decrease. The Tg of the (meth)acryl-based oligomer is also a theoretical value calculated from the Fox equation like the Tg of the (meth)acryl-based polymer.

The (meth)acryl-based oligomer may have a weight average molecular weight of 1,000 to less than 30,000, preferably 1,500 to less than 20,000, more preferably 2,000 to less than 10,000. If the oligomer has a weight average molecular weight of 30,000 or more, the effect of improving adhesive strength cannot be sufficiently obtained in some cases. The oligomer with a weight average molecular weight of less than 1,000 may lower the adhesive strength or holding performance because of its relatively low molecular weight. In the invention, the weight average molecular weight of the (meth)acryl-based oligomer can be determined as a polystyrene-equivalent weight average molecular weight by GPC method. More specifically, the weight average molecular weight can be determined using HPLC 8020 with two TSKgel GMH-H (20) columns manufactured by TOSOH CORPORATION under the conditions of a solvent of tetrahydrofuran and a flow rate of about 0.5 ml/minute.

Examples of monomers that may be used to form the (meth)acryl-based oligomer include alkyl(meth)acrylate such as methyl(meth)acrylate, ethyl(meth)acrylate, propyl (meth)acrylate, isopropyl(meth)acrylate, butyl(meth)acrylate, isobutyl(meth)acrylate, sec-butyl(meth)acrylate, tert-butyl(meth)acrylate, pentyl(meth)acrylate, isopentyl(meth) acrylate, hexyl(meth)acrylate, 2-ethylhexyl(meth)acrylate, heptyl(meth)acrylate, octyl(meth)acrylate, isooctyl(meth) acrylate, nonyl(meth)acrylate, isononyl(meth)acrylate, decyl(meth)acrylate, isodecyl(meth)acrylate, undecyl(meth) acrylate, or dodecyl(meth)acrylate; an ester of (meth)acrylic acid and an alicyclic alcohol, such as cyclohexyl(meth) acrylate, isobornyl(meth)acrylate or dicyclopentanyl(meth) acrylate; aryl(meth)acrylate such as phenyl(meth)acrylate or benzyl(meth)acrylate; and a (meth)acrylate derived from a terpene compound derivative alcohol. These (meth)acrylates may be used alone or in combination of two or more.

The (meth)acryl-based oligomer preferably contains, as a monomer unit, an acrylic monomer having a relatively bulky structure, typified by an alkyl(meth)acrylate whose alkyl group has a branched structure, such as isobutyl(meth) acrylate or tert-butyl(meth)acrylate; an ester of (meth) acrylic acid and an alicyclic alcohol, such as cyclohexyl (meth)acrylate, isobornyl(meth)acrylate or dicyclopentanyl (meth)acrylate; or aryl(meth)acrylate such as phenyl(meth) acrylate or benzyl(meth)acrylate, or any other cyclic structure-containing (meth)acrylate. The use of a (meth) acryl-based oligomer with such a bulky structure can further improve the tackiness of the pressure-sensitive adhesive layer. In terms of bulkiness, cyclic structure-containing oligomers are highly effective, and oligomers having two or more rings are more effective. When ultraviolet (UV) light is used in the process of synthesizing the (meth)acryl-based oligomer or forming the pressure-sensitive adhesive layer, a saturated oligomer is preferred because such an oligomer is less likely to inhibit polymerization, and an alkyl(meth) acrylate whose alkyl group has a branched structure or an ester of an alicyclic alcohol and (meth)acrylic acid is preferably used as a monomer to form the (meth)acryl-based oligomer.

From these points of view, preferred examples of the (meth)acryl-based oligomer include a copolymer of cyclohexyl methacrylate (CHMA) and isobutyl methacrylate (IBMA), a copolymer of cyclohexyl methacrylate (CHMA) and isobornyl methacrylate (IBXMA), a copolymer of cyclohexyl methacrylate (CHMA) and acryloyl morpholine (ACMO), a copolymer of cyclohexyl methacrylate (CHMA) and diethylacrylamide (DEAA), a copolymer of 1-adamanthyl acrylate (ADA) and methyl methacrylate (MMA), a copolymer of dicyclopentanyl methacrylate (DCPMA) and isobornyl methacrylate (IBXMA), a copolymer of dicyclopentanyl methacrylate (DCPMA) and methyl methacrylate (MMA), and a homopolymer of each of dicyclopentanyl methacrylate (DCPMA), cyclohexyl methacrylate (CHMA), isobornyl methacrylate (IBXMA), isobornyl acrylate (IBXA), dicyclopentanyl acrylate (DCPA), 1-adamanthyl methacrylate (ADMA), and 1-adamanthyl acrylate (ADA). In particular, an oligomer composed mainly of CHMA is preferred.

In the radiation-curable pressure-sensitive adhesive of the invention, the content of the (meth)acryl-based oligomer is preferably, but not limited to, 70 parts by weight or less, more preferably from 1 to 70 parts by weight, even more preferably from 2 to 50 parts by weight, still more preferably from 3 to 40 parts by weight, based on 100 parts by weight of the (meth)acryl-based polymer. If the content of the (meth)acryl-based oligomer is more than 70 parts by weight, a problem may occur such as an increase in elastic modulus or a decrease in tackiness at low temperature. Adding 1 part by weight or more of the (meth)acryl-based oligomer is effective in improving adhesive strength.

The radiation-curable pressure-sensitive adhesive of the invention may further contain a silane coupling agent for improving water resistance at the interface between the pressure-sensitive adhesive layer and a hydrophilic adherend, such as glass, bonded thereto. The content of the silane coupling agent is preferably 1 part by weight or less, more preferably from 0.01 to 1 part by weight, even more preferably from 0.02 to 0.6 parts by weight, based on 100 parts by weight of the (meth)acryl-based polymer. If the content of the silane coupling agent is too high, the adhesive may have a higher adhesive strength to glass so that it may be less removable from glass. If the content of the silane coupling agent is too low, the durability of the adhesive may undesirably decrease.

Examples of silane coupling agent include epoxy group-containing silane coupling agents such as 3-glycidoxypropyltrimethoxysilane, 3-glycidoxypropyltriethoxysilane, 3-glycidoxypropylmethyldiethoxysilane, and 2-(3,4-epoxycyclohexyl)ethyltrimethoxysilane; amino group-containing silane coupling agents such as 3-aminopropyltrimethoxysilane, N-(2-aminoethyl)-3-aminopropylmethyldimethoxysilane, 3-triethoxysilyl-N-(1,3-dimethylbutylidene)propylamine and N-phenyl-γ-aminopropyltrimethoxysilane; (meth) acrylic group-containing silane coupling agents such as 3-acryloxypropyltrimethoxysilane and 3-methacryloxypropyltriethoxysilane; and isocyanate group-containing silane coupling agents such as 3-isocyanatepropyltriethoxysilane.

The radiation-curable pressure-sensitive adhesive of the invention may also contain any other known additive. For example, a powder such as a colorant and a pigment, a dye, a surfactant, a plasticizer, a tackifier, a surface lubricant, a leveling agent, a softening agent, an antioxidant, an age resister, a light stabilizer, an ultraviolet absorbing agent, a polymerization inhibitor, an inorganic or organic filler, a metal powder, or a particle- or foil-shaped material may be added as appropriate depending on the intended use. The content of these additives can be appropriately determined if it is within the range that does not impair the effect of the invention, and it is, for example, preferably 10 parts by weight or less based on 100 parts by weight of the (meth) acryl-based polymer.

Examples of the tackifier include petroleum-based resins, terpene-based resins, and hydrogenation products thereof. The tackifier used in the radiation-curable pressure-sensitive adhesive of the invention is preferably a hydrogenated tackifier that does not inhibit the curing by radiation such as ultraviolet rays. The tackifier can improve the adhering strength of the radiation-curable pressure-sensitive adhesive of the invention likewise the (meth)acryl-based oligomer. Further, the tackifier may be used in the same proportion as the (meth)acryl-based oligomer.

The radiation-curable pressure-sensitive adhesive layer of the invention is formed from the radiation-curable pressure-sensitive adhesive. The thickness of the pressure-sensitive adhesive layer is typically, but not limited to, from about 1 to 400 μm, preferably from 50 to 400 μm, more preferably from 75 to 300 μm, further preferably from 100 to 200 μm.

The radiation-curable pressure-sensitive adhesive layer of the invention may be cured after being bonded to an adherend. When radiation irradiation is carried out by UV irradiation, it is possible to use a high-pressure mercury lamp, a low-pressure mercury lamp, a metal halide lamp or the like. Usually, the amount of ultraviolet irradiation is about 1000 to 10000 mJ/cm$^2$.

The radiation-curable pressure-sensitive adhesive layer of the invention before radiation curing has preferably a shear storage modulus of $1.5 \times 10^4$ to $1.2 \times 10^5$ Pa at 23° C. and $2.0 \times 10^3$ to $4.0 \times 10^4$ Pa at 70° C. and a gel fraction of 0 to 60% by weight, from the viewpoint of good ink step absorbability and good handling property. The shear storage modulus at 23° C. before radiation curing is more preferably $2.0 \times 10^4$ to $1.0 \times 10^5$ Pa, still more preferably $2.0 \times 10^4$ to $9.0 \times 10^4$ Pa, and even more preferably $3.0 \times 10^4$ to $7.0 \times 10^4$ Pa, and the shear storage modulus at 70° C. before radiation curing is more preferably $5.0 \times 10^3$ to $4.0 \times 10^4$ Pa, still more preferably $1.0 \times 10^4$ to $3.0 \times 10^4$ Pa, and even more preferably $1.0 \times 10^4$ to $2.5 \times 10^4$ Pa, and the gel fraction is more preferably 0 to 55% by weight, still more preferably 5 to 55% by weight, even more preferably 5 to 50% by weight, further preferably 5 to 45% by weight, furthermore preferably 5 to 35% by weight, and still furthermore preferably 10 to 35% by weight.

The higher gel fraction before radiation curing is preferred from the viewpoint of processability (ease of handling). For example, the gel fraction is preferably within the range of 20 to 60% by weight and more preferably within the range of 30 to 60% by weight. In addition, from the viewpoint of ink step absorbability, the gel fraction is, for example, preferably within the range of 0 to 45% by weight and more preferably within the range of 0 to 40% by weight. Accordingly, from the viewpoint of achieving both ink step absorbability and processability, the gel fraction is preferably 0 to 60% by weight, more preferably 0 to 55% by weight, still more preferably 10 to 50% by weight, even more preferably 20 to 45% by weight, and further preferably 30 to 45% by weight.

In the pressure-sensitive adhesive layer of the invention after radiation curing, it is preferable that the shear storage modulus at 23° C. is $5.0 \times 10^4$ to $2.5 \times 10^6$ Pa and the shear storage modulus at 70° C. is $1.5 \times 10^4$ to $1.5 \times 10^5$ Pa, and the gel fraction is 40 to 95% by weight from the viewpoint of suppressing peeling from the adherend. The shear storage modulus at 23° C. after radiation curing is more preferably $5.0 \times 10^4$ to $1.0 \times 10^6$ Pa, still more preferably $8.0 \times 10^4$ to $4.5 \times 10^5$ Pa, even more preferably $9.0 \times 10^4$ to $3.0 \times 10^5$ Pa, and further preferably $1.0 \times 10^5$ to $2.0 \times 10^5$ Pa, and the shear storage modulus at 70° C. is more preferably $2.0 \times 10^4$ to $1.0 \times 10^5$ Pa, still more preferably $3.0 \times 10^4$ to $1.0 \times 10^5$ Pa, and even more preferably $3.0 \times 10^4$ to $8.0 \times 10^4$ Pa, and the gel fraction is more preferably 45 to 85% by weight and still more preferably 50 to 75% by weight. The curing conditions of radiation irradiation involved in the storage modulus and gel fraction are based on the description of Examples.

The shear storage moduli at 23° C. and 70° C. after radiation curing are preferably equivalent to or more than the values before radiation curing. The value of the shear storage modulus at 23° C. after radiation curing is preferably 1.0 to 30 times, more preferably 1.0 to 27 times, still more preferably 1.5 to 20 times, and even more preferably 2.0 to 10 times the value before radiation curing. In addition, the shear storage modulus at 70° C. after radiation curing is preferably 1.0 to 15 times, more preferably 1.5 to 8 times, and still more preferably 2.0 to 5 times the value before radiation curing.

It is preferable that the value of the gel fraction after radiation curing is equivalent to or more than the value before radiation curing. The value after radiation curing is preferably 1.2 to 10 times the value before radiation curing, more preferably 1.2 to 8 times the value before radiation curing, and furthermore preferably 1.2 to 5 times the value before radiation curing.

The shear storage modulus and gel fraction of the radiation-curable pressure-sensitive adhesive layer can be controlled by adjusting the proportion of the radically polymerizable polyfunctional group containing a carbon-carbon double bond contained in the radiation-curable pressure-sensitive adhesive while taking into consideration of the effects of the treatment temperature and treatment time of the curing. Further, when the pressure-sensitive adhesive contains a crosslinking agent, the gel fraction can be controlled by adjusting the content of the crosslinking agent added in total while sufficiently taking into consideration of the effects of treatment temperature and treatment time of the crosslinking. It is to be noted that when the gel fraction of the pressure-sensitive adhesive layer after curing is small, the cohesive strength may become poor, and when the gel fraction of the pressure-sensitive adhesive layer after curing is too large, the adhering strength may become poor.

The radiation-curable pressure-sensitive adhesive layer of the invention preferably has a relative dielectric constant of 3.7 or less, more preferably 3.5 or less, even more preferably 3.3 or less, still more preferably 3.2 or less at a frequency of 100 kHz.

The radiation-curable pressure-sensitive adhesive layer of the invention preferably has a haze value of 2% or less when having a thickness of 100 μm. The pressure-sensitive adhesive layer with a haze value of 2% or less can satisfy the requirements for transparency when it is used on optical members. The haze value is preferably from 0 to 1.5%, more preferably from 0 to 1%. A haze value of 2% or less is a satisfactory level for optical applications. If the haze value is more than 2%, cloudiness may occur, which is not preferred for optical film.

For example, the pressure-sensitive adhesive layer may be formed by a method including applying the radiation-curable pressure-sensitive adhesive to a support, removing the polymerization solvent and so on by drying to form a pressure-sensitive adhesive sheet. Before the radiation-curable pressure-sensitive adhesive is applied, appropriately at least one solvent other than the polymerization solvent may be added to the radiation-curable pressure-sensitive adhesive.

Various methods may be used to apply the radiation-curable pressure-sensitive adhesive. Specific examples of such methods include roll coating, kiss roll coating, gravure coating, reverse coating, roll brush coating, spray coating, dip roll coating, bar coating, knife coating, air knife coating, curtain coating, lip coating, and extrusion coating with a die coater or the like.

The heat drying temperature is preferably from 40° C. to 200° C., more preferably from 50° C. to 180° C., in particular, preferably from 70° C. to 170° C. Setting the heating temperature within the above range makes it possible to obtain a pressure-sensitive adhesive layer having good adhesive properties. The drying time may be any appropriate period of time. The drying time is preferably from 5 seconds to 20 minutes, more preferably from 5 seconds to 10 minutes, in particular, preferably from 10 seconds to 5 minutes.

For example, a release-treated sheet may be used as the support. A silicone release liner is preferably used as the release-treated sheet.

In the pressure-sensitive adhesive sheet include the layer pressure-sensitive adhesive layer formed on the release-treated sheet, when the pressure-sensitive adhesive layer is exposed, the pressure-sensitive adhesive layer may be protected with the release-treated sheet (a separator) before practical use. The release-treated sheet is peeled off before actual use.

Examples of the material for forming the separator include a plastic film such as a polyethylene, polypropylene, polyethylene terephthalate, or polyester film, a porous material such as paper, cloth and nonwoven fabric, and an appropriate thin material such as a net, a foamed sheet, a metal foil, and a laminate thereof. In particular, a plastic film is preferably used, because of its good surface smoothness.

The plastic film may be any film capable of protecting the pressure-sensitive adhesive layer, and examples thereof include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the separator is generally from about 5 to about 200 μm, preferably from about 5 to about 100 μm. If necessary, the separator may be treated with a release agent such as a silicone, fluorine, long-chain alkyl, or fatty acid amide release agent, or may be subjected to release and antifouling treatment with silica powder or to antistatic treatment of coating type, kneading and mixing type, vapor-deposition type, or the like. In particular, if the surface of the separator is appropriately subjected to release treatment such as silicone treatment, long-chain alkyl treatment, and fluorine treatment, the releasability from the pressure-sensitive adhesive layer can be further increased.

The radiation-curable pressure-sensitive adhesive layer and radiation-curable pressure-sensitive adhesive sheet of the invention can be applied to various members each of which serves as an adherend. Further, such an adhesive layer and a sheet can be used preferably for formation of a laminate in which a first member and a second member are bonded together Particularly in the laminate, the radiation-curable pressure-sensitive adhesive layer and pressure-sensitive adhesive sheet of the invention is suitable for a case where at least one of the first member and the second member is a member having a surface with an ink step and it is possible to perform the bonding without gaps while following the ink step. The ink step is irregularities on the plane surface of each member, and is the maximum height from the plane surface in the thickness direction of each member. The radiation-curable pressure-sensitive adhesive layer of the invention has a good followability to the ink step and can be used preferably in a case where the ink step (μm) and the thickness (μm) of the pressure-sensitive adhesive layer satisfy the expression of (ink step/thickness of pressure-sensitive adhesive layer)≤0.9. Even in a case where the ratio of the ink step to the thickness of the pressure-sensitive adhesive layer is large such as in the range of 0.5 to 0.9, the radiation-curable pressure-sensitive adhesive layer of the invention shows the ink step absorbability.

The radiation-curable pressure-sensitive adhesive layer and the pressure-sensitive adhesive sheet of the invention are suitable for use on optical members, and particularly in optical applications, they are preferably used and bonded to metal thin layers or metal electrodes. Metal thin layers include thin layers of metal, metal oxide, or a mixture of metal and metal oxide, and examples of metal thin layers include, but are not limited to, thin layers of ITO (indium tin oxide), ZnO, SnO, and CTO (cadmium tin oxide). The thickness of metal thin layers is typically, but not limited to, about 10 to 200 nm. Usually, for example, a metal thin layer such as an ITO layer is provided on a transparent plastic film substrate such as a polyethylene terephthalate film (specifically, a PET film) to form a transparent conductive film for use. When the pressure-sensitive adhesive sheet of the invention is bonded to a metal thin layer, the surface of the pressure-sensitive adhesive layer is preferably used as a bonding surface to the metal thin layer.

The metal electrodes may be made of metal, metal oxide, or a mixture of metal and metal oxide, and examples include, but are not limited to, ITO, silver, copper, and CNT (carbon nanotube) electrodes.

A specific example of the use of the pressure-sensitive adhesive sheet of the invention is a touch panel-forming pressure-sensitive adhesive sheet, which is used in the manufacture of a touch panel. For example, the touch panel-forming pressure-sensitive adhesive sheet is used in the manufacture of a capacitance touch panel, where it is used to bond a transparent conductive film having a metal thin layer such as an ITO layer to a poly(methyl methacrylate) (PMMA) resin sheet, a hard-coated film, a glass lens, or any other material. Applications of the touch panel include, but are not limited to, cellular phones, tablet computers, and personal digital assistances.

FIG. 1 shows a more specific example of the use of the pressure-sensitive adhesive layer or the pressure-sensitive adhesive sheet of the invention, which is an example of a capacitance touch panel. FIG. 1 shows a capacitance touch panel 1 including a decorative panel 11, pressure-sensitive adhesive layers or pressure-sensitive adhesive sheets 12, ITO films 13, and a hard coated film 14. The decorative panel 11 is preferably a glass plate or a transparent acrylic plate (PMMA plate). The decorative panel 11 is subjected to printing on cover glass and the like, and may have a printing step. The pressure-sensitive adhesive layer or the pressure-sensitive adhesive sheet of the invention is suitable for the printing step. Each ITO films 13 preferably includes a glass sheet or a transparent plastic film (specifically, a PET film) and an ITO layer provided thereon. The hard coated film 14 is preferably a hard coated transparent plastic film such as a hard coated PET film. The capacitance touch panel 1 having the pressure-sensitive adhesive layer or the pressure-sensitive adhesive sheet of the invention can be made thinner and more stable in operation. The capacitance touch panel 1 also has a good appearance and good visibility.

An optical member may be used as the support of the pressure-sensitive adhesive sheet of the invention. The pressure-sensitive adhesive layer can be formed by a process including applying the pressure-sensitive adhesive directly to an optical member and drying the adhesive to remove the polymerization solvent and the like, so that the pressure-sensitive adhesive layer is formed on the optical member. Alternatively, the pressure-sensitive adhesive layer may be formed on a release-treated separator and then transferred to an optical member as needed to form a pressure-sensitive adhesive optical member.

The release-treated sheet used in the preparation of the pressure-sensitive adhesive optical member of the invention may be used by itself as a separator for the pressure-sensitive adhesive optical member, so that the process can be simplified.

The process for forming the pressure-sensitive adhesive layer for the pressure-sensitive adhesive optical member may further include forming an anchor layer on the surface of the optical member or performing any adhesion-facilitating treatment such as a corona treatment or a plasma treatment before forming the pressure-sensitive adhesive layer. The surface of the pressure-sensitive adhesive layer may also be subjected to an adhesion-facilitating treatment.

The pressure-sensitive adhesive optical member of the invention may be used as a pressure-sensitive adhesive layer-carrying transparent conductive film, which is produced using a transparent conductive film as an optical member. The transparent conductive film includes a transparent plastic film substrate and a transparent conductive thin layer that is formed of a metal thin layer such as the ITO layer on one surface of the substrate. The pressure-sensitive adhesive layer of the invention is provided on the other surface of the transparent plastic film substrate. The transparent conductive thin layer may be provided on the transparent plastic film substrate with an undercoat layer interposed therebetween. Two or more undercoat layers may be provided. An oligomer migration-preventing layer may be provided between the transparent plastic film substrate and the pressure-sensitive adhesive layer.

The transparent plastic film substrate to be used may be, but not limited to, various transparent plastic films. The plastic film is generally formed of a monolayer film. Examples of the material for the transparent plastic film substrate include polyester resins such as polyethylene terephthalate and polyethylene naphthalate, acetate resins, polyethersulfone resins, polycarbonate resins, polyamide resins, polyimide resins, polyolefin resins, (meth)acrylic resins, polyvinyl chloride resins, polyvinylidene chloride resins, polystyrene resins, polyvinyl alcohol resins, polyarylate resins, and polyphenylene sulfide resins. In particular, polyester resins, polyimide resins, and polyethersulfone resins are preferred. The film substrate preferably has a thickness of 15 to 200 μm.

The surface of the film substrate may be previously subject to sputtering, corona discharge treatment, flame treatment, ultraviolet irradiation, electron beam irradiation, chemical treatment, etching treatment such as oxidation, or undercoating treatment such that the adhesion of the transparent conductive thin layer or the undercoat layer formed thereon to the transparent plastic film substrate can be improved. If necessary, the film substrate may also be subjected to dust removing or cleaning by solvent cleaning, ultrasonic cleaning or the like, before the transparent conductive thin layer or the undercoat layer is formed.

The material and thickness of the transparent conductive thin layer are not restricted and may be those described for the metal thin layer. The undercoat layer may be made of an inorganic material, an organic material or a mixture of an inorganic material and an organic material. Examples of the inorganic material include NaF (1.3), $Na_3AlF_6$ (1.35), LiF (1.36), $MgF_2$ (1.38), $CaF_2$ (1.4), $BaF_2$ (1.3), $SiO_2$ (1.46), $LaF_3$ (1.55), $CeF_3$ (1.63), and $Al_2O_3$ (1.63), wherein each number inside the parentheses is the refractive index of each material. In particular, $SiO_2$, $MgF_2$, $Al_2O_3$, or the like is preferably used. In particular, $SiO_2$ is preferred. Besides the above, a complex oxide containing about 10 to about 40 parts by weight of cerium oxide and about 0 to about 20 parts by weight of tin oxide based on 100 parts by weight of the indium oxide may also be used.

Examples of the organic material include acrylic resins, urethane resins, melamine resins, alkyd resins, siloxane polymers, and organosilane condensates. At least one of these organic materials may be used. In particular, a thermosetting resin including a mixture composed of a melamine resin, an alkyd resin and an organosilane condensate is preferably used as the organic material.

The thickness of the undercoat layer is generally, but not limited to, from about 1 to about 300 nm, preferably from about 5 to about 300 nm, in view of optical design and the effect of preventing the release of an oligomer from the film substrate.

The pressure-sensitive adhesive layer-carrying transparent conductive film can be used to form various devices such as touch panels and liquid crystal display devices. In particular, the pressure-sensitive adhesive layer-carrying transparent conductive film is preferably used as a touch panel-forming electrode sheet. The touch panel is suitable for use in different types of detection (such as resistive and capacitance types).

A capacitance touch panel usually includes a transparent conductive film that has a transparent conductive thin layer in a specific pattern and is formed over the surface of a display unit. The pressure-sensitive adhesive layer-carrying transparent conductive film is a laminate in which the pressure-sensitive adhesive layer and the patterned transparent conductive thin layer are appropriately stacked facing each other.

The pressure-sensitive adhesive optical member of the invention may be used as a pressure-sensitive adhesive layer-carrying optical film, which is produced using an image display-forming optical film as the optical member.

The optical film may be of any type for use in forming image display devices such as liquid crystal display devices and organic electro-luminescent (EL) display devices. For example, a polarizing plate is exemplified as the optical film. A polarizing plate including a polarizer and a transparent protective film provided on one or both sides of the polarizer is generally used.

A polarizer is not limited especially but various kinds of polarizer may be used. As a polarizer, for example, a film that is uniaxially stretched after having dichromatic substances, such as iodine and dichromatic dye, absorbed to hydrophilic polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions containing boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions containing boric acid and/or potassium iodide, and in water bath.

A thermoplastic resin with a high level of transparency, mechanical strength, thermal stability, moisture blocking properties, isotropy, and the like may be used as a material for forming the transparent protective film. Examples of such a thermoplastic resin include cellulose resins such as triacetylcellulose, polyester resins, polyethersulfone resins, polysulfone resins, polycarbonate resins, polyamide resins, polyimide resins, polyolefin resins, (meth)acrylic resins, cyclic olefin polymer resins (norbornene resins), polyarylate resins, polystyrene resins, polyvinyl alcohol resins, and any mixture thereof. The transparent protective film is generally laminated to one side of the polarizer with the adhesive layer, but thermosetting resins or ultraviolet curing resins such as (meth)acrylic, urethane, acrylic urethane, epoxy, or silicone resins may be used to other side of the polarizer for the transparent protective film. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

Further an optical film of the invention may be used as other optical layers, such as a reflective plate, a transflective plate, a retardation plate (a half wavelength plate and a quarter wavelength plate included), an optical compensation film, a viewing angle compensation film and a brightness enhancement film, which may be used for formation of a liquid crystal display device etc. These are used in practice as an optical film, or as one layer or two layers or more of optical layers laminated with polarizing plate.

Although an optical film with the above described optical layer laminated to the polarizing plate may be formed by a method in which laminating is separately carried out sequentially in manufacturing process of a liquid crystal display device etc., an optical film in a form of being laminated beforehand has an outstanding advantage that it has excellent stability in quality and assembly workability, etc., and thus manufacturing processes ability of a liquid crystal display device etc. may be raised. Proper adhesion means, such as a pressure-sensitive adhesive layer, may be used for laminating. On the occasion of adhesion of the above described polarizing plate and other optical layers, the optical axis may be set as a suitable configuration angle according to the target retardation characteristics etc.

The pressure-sensitive adhesive layer-carrying optical film of the invention is preferably used to form various types of image display devices such as liquid crystal display devices. Liquid crystal display devices may be formed according to conventional techniques. Specifically, liquid crystal display devices are generally formed by appropriately assembling a liquid crystal cell and the pressure-sensitive adhesive layer-carrying optical film and optionally other component such as a lighting system and incorporating a driving circuit according to any conventional technique, except that the pressure-sensitive layer-carrying adhesive optical film of the invention is used. Any type of liquid crystal cell may also be used such as a TN type, an STN type, a π type, a VA type and IPS type.

Suitable liquid crystal display devices, such as liquid crystal display device with which the pressure-sensitive adhesive layer-carrying optical film has been located at one side or both sides of the liquid crystal cell, and with which a backlight or a reflective plate is used for a lighting system may be manufactured. In this case, the optical film according to the invention may be installed in one side or both sides of the liquid crystal cell. When installing the optical films in both sides, they may be of the same type or of different type. Furthermore, in assembling a liquid crystal display device, suitable parts, such as diffusion plate, anti-glare layer, anti-reflection film, protective plate, prism array, lens array sheet, optical diffusion plate, and backlight, may be installed in suitable position in one layer or two or more layers.

EXAMPLES

The present invention will be specifically described below by way of Examples, but the invention is not limited thereto. In each Example, both "part" and "%" are based on weight.

Example 1

<Preparation of (Meth)Acryl-Based Polymer>

A four-neck flask equipped with a stirring wing, a thermometer, a nitrogen gas introducing tube, and a condenser was charged with 43 parts by weight of 2-ethylhexyl acrylate (2EHA), 43 parts by weight of isostearyl acrylate (ISTA) (trade name: ISTA, manufactured by Osaka Organic Chemical Industry Ltd.), 10 parts by weight of N-vinylpyrrolidone (NVP), 4 parts by weight of 4-hydroxybutyl acrylate (4HBA), and 0.1 parts by weight of 2,2'-azobisisobutyronitrile (AIBN) as a thermal polymerization initiator, together with 150 parts by weight of ethyl acetate. The mixture was then stirred at 23° C. for 1 hour under a nitrogen atmosphere and allowed to react at 58° C. for 4 hours and then at 70° C. for 2 hours, thereby to prepare a (meth)acryl-based polymer solution.

<Preparation of Radiation-Curable Pressure-Sensitive Adhesive>(1)

Then, to the (meth)acryl-based polymer solution obtained above were added 10 parts by weight of polypropylene glycol (#700) diacrylate (trade name: APG-700, manufactured by Shin-Nakamura Chemical Co., Ltd.) as a radiation-curable monomer component, 0.1 parts by weight of a photopolymerization initiator (trade name: IRGACURE 184, manufactured by BASF), 0.3 parts by weight of 3-glycidoxypropyl trimethoxysilane (trade name: KBM403, manufactured by Shin-Etsu Chemical Co., Ltd.) as a silane coupling agent, and 0.04 parts by weight of a trimethylolpropane adduct of xylylene diisocyanate (trade name: D110N, manufactured by Mitsui Chemicals, Inc.) as a crosslinking agent, based on 100 parts by weight of the solid content of the polymer. Subsequently, the mixture was uniformly mixed to prepare a radiation-curable pressure-sensitive adhesive (1) solution.

<Formation of Radiation-Curable Pressure-Sensitive Adhesive Layer: Production of Pressure-Sensitive Adhesive Sheet>

A radiation-curable pressure-sensitive adhesive layer having a thickness of 100 μm was formed by applying the radiation-curable pressure-sensitive adhesive (1) solution obtained above to the peel off-treated surface of a 50 μm thick polyester film of which one side had been peel off-treated with silicone and heating the coated surface at 100° C. for 3 minutes. Then, the 75 μm thick polyester film of which one side had been peel off-treated with silicone was bonded to the coated surface of the radiation-curable pressure-sensitive adhesive layer such that the peel off-treated surface of the film faced the coat layer, thereby to produce a pressure-sensitive adhesive sheet.

Examples 2 to 14 and Comparative Examples 1 to 2

A pressure-sensitive adhesive sheet was prepared in the same procedure as in Example 1, except that the kind and composition ratio of the monomers used in the <Preparation of (Meth)acryl-Based Polymer>, and the addition amounts of the radiation-curable monomer component, photopolymerization initiator, and the crosslinking agent used in the <Preparation of Radiation-Curable Pressure-Sensitive Adhesive (1)> were changed as shown in Table 1.

Example 15

<Preparation of Radiation-Curable Pressure-Sensitive Adhesive (2)>

An addition reaction of 2 parts by weight of 2-methacryloyloxyethyl isocyanate (MOI) with 100 parts by weight of the solid content of the (meth)acryl-based polymer solution prepared in Example 1 was performed so that a methacryloyl group was introduced into the side chain of the polymer molecule. Then, after 0.1 parts by weight of a photopolymerization initiator (trade name: IRGACURE 184, manufactured by BASF), 0.3 parts by weight of 3-glycidoxypropyl trimethoxysilane (trade name: KBM403, manufactured by Shin-Etsu Chemical Co., Ltd.) as a silane coupling agent, and 0.04 parts by weight of a trimethylolpropane adduct of xylylene diisocyanate (trade name: D110N, manufactured by Mitsui Chemicals, Inc.) as a crosslinking agent were added thereto, the resultant was uniformly mixed to prepare a solution of a radiation-curable pressure-sensitive adhesive (2).

<Formation of Radiation-Curable Pressure-Sensitive Adhesive Layer: Production of Pressure-Sensitive Adhesive Sheet>

A pressure-sensitive adhesive sheet was prepared in the same procedure as in Example 1, except that the solution of a radiation-curable pressure-sensitive adhesive (2) prepared above was used in place of the solution of a radiation-curable pressure-sensitive adhesive (1) in Example 1.

Comparative Example 3

Preparation of (Meth)Acryl-Based Polymer

A four-neck flask equipped with a stirring wing, a thermometer, a nitrogen gas introducing tube, and a condenser was charged with 90 parts by weight of 2-ethylhexyl acrylate (2EHA), 10 parts by weight of acrylic acid (AA), 0.35 parts by weight of 4-methacroyloxybenzophenone (MBP), and 0.4 parts by weight of 2,2'-azobis(2,4-valeronitrile) (trade name: V-65, manufactured by Wako Pure Chemical Industries, Ltd.) as a thermal polymerization initiator, together with 150 parts by weight of methyl ethyl ketone (MEK). The mixture was stirred at 23° C. for 1 hour under a nitrogen atmosphere and allowed to react at 50° C. for 4 hours and then at 60° C. for 2 hours, thereby to prepare a (meth)acryl-based polymer solution.

<Preparation of Radiation-Curable Pressure-Sensitive Adhesive (3)>

Subsequently, to the (meth)acryl-based polymer solution obtained above was added 0.3 parts by weight of 3-glycidoxypropyl trimethoxysilane (trade name: KBM403, manufactured by Shin-Etsu Chemical Co., Ltd.) as a silane coupling agent based on 100 parts by weight of the solid content of the polymer, and the mixture was then uniformly mixed to prepare a radiation-curable pressure-sensitive adhesive (3) solution.

<Formation of Radiation-Curable Pressure-Sensitive Adhesive Layer: Production of Pressure-Sensitive Adhesive Sheet>

A radiation-curable pressure-sensitive adhesive layer having a thickness of 100 μm was formed by applying the radiation-curable pressure-sensitive adhesive (3) solution obtained above to the peel off-treated surface of a 50 μm thick polyester film of which one side had been peel off-treated with silicone and heating the coated surface at 100°

C. for 3 minutes. Then, the 75 μm thick polyester film of which one side had been peel off-treated with silicone was bonded to the coated surface of the radiation-curable pressure-sensitive adhesive layer such that the peel off-treated surface of the film faced the coat layer, thereby to produce a pressure-sensitive adhesive sheet.

TABLE 1

| | Pressure-sensitive adhesive composition | | | | | | | | | | | |
|---|---|---|---|---|---|---|---|---|---|---|---|---|
| | Monomer composition (by weight) of (Meth)acryl-Based Polymer | | | | | | | | | | | |
| | 2EHA | ISTA | LMA | LA | iDMA | AA | MMA | NVP | NVC | 4HBA | HEA | MBP |
| Example 1 | 43 | 43 | — | — | — | — | — | 10 | — | 4 | — | — |
| Example 2 | 46.8 | 31.2 | — | — | — | — | — | 18 | — | 4 | — | — |
| Example 3 | 31.2 | 46.8 | — | — | — | — | — | 18 | — | 4 | — | — |
| Example 4 | 40 | 40 | — | — | — | — | — | 10 | — | 10 | — | — |
| Example 5 | 32 | 48 | — | — | — | — | — | 10 | — | 10 | — | — |
| Example 6 | 43 | 43 | — | — | — | — | — | 10 | — | 4 | — | — |
| Example 7 | 32 | 48 | — | — | — | — | — | 10 | — | 10 | — | — |
| Example 8 | 32 | 48 | — | — | — | — | — | 10 | — | 10 | — | — |
| Example 9 | 32 | 48 | — | — | — | — | — | 10 | — | 10 | — | — |
| Example 10 | 32 | 48 | — | — | — | — | — | 10 | — | 10 | — | — |
| Example 11 | 8 | 72 | — | — | — | — | — | 10 | — | 10 | — | — |
| Example 12 | — | 80 | — | — | — | — | — | 10 | — | 10 | — | — |
| Example 13 | — | — | — | 80 | — | — | — | 10 | — | 10 | — | — |
| Example 14 | — | — | 9 | — | 64 | — | — | — | 18 | 9 | — | — |
| Example 15 | 43 | 43 | — | — | — | — | — | 10 | — | 4 | — | — |
| Comparative Example 1 | 46.8 | 31.2 | — | — | — | — | — | 18 | — | 4 | — | — |
| Comparative Example 2 | 76 | — | — | — | — | — | 9 | 10 | — | — | 5 | — |
| Comparative Example 3 | 90 | — | — | — | — | 10 | — | — | — | — | — | 0.35 |

| | Pressure-sensitive adhesive composition | | | | | | | | |
|---|---|---|---|---|---|---|---|---|---|
| | Component related to radically polymerizable functional group | | | | | | Cross-linking agent: D110N Addition amount (part by weight) | Photopoly-merization initiator Addition amount (part by weight) | Si coupling agent Addition amount (part by weight) |
| | APG-700 | APG-400 | HX-620 | A-PTMG65 | M-1200 | MOI | | | |
| Example 1 | 10 | — | — | — | — | — | 0.04 | 0.1 | 0.3 |
| Example 2 | 40 | — | — | — | — | — | 0.02 | 0.1 | 0.3 |
| Example 3 | 40 | — | — | — | — | — | 0.02 | 0.1 | 0.3 |
| Example 4 | 10 | — | — | — | — | — | 0.04 | 0.1 | 0.3 |
| Example 5 | 10 | — | — | — | — | — | 0.04 | 0.1 | 0.3 |
| Example 6 | — | 10 | — | — | — | — | 0.04 | 0.1 | 0.3 |
| Example 7 | 7 | — | — | — | — | — | 0.07 | 0.1 | 0.3 |
| Example 8 | — | — | 10 | — | — | — | 0.03 | 0.1 | 0.3 |
| Example 9 | — | — | — | 10 | — | — | 0.03 | 0.1 | 0.3 |
| Example 10 | — | — | — | — | 10 | — | 0.03 | 0.1 | 0.3 |
| Example 11 | 10 | — | — | — | — | — | 0.07 | 0.1 | 0.3 |
| Example 12 | 10 | — | — | — | — | — | 0.07 | 0.1 | 0.3 |
| Example 13 | 10 | — | — | — | — | — | 0.07 | 0.1 | 0.3 |
| Example 14 | 10 | — | — | — | — | — | 0.07 | 0.1 | 0.3 |
| Example 15 | — | — | — | — | — | 2 | 0.02 | 0.1 | 0.3 |
| Comparative Example 1 | — | — | — | — | — | — | 0.1 | — | 0.3 |
| Comparative Example 2 | 40 | — | — | — | — | — | 0.9 | 0.1 | 0.3 |
| Comparative Example 3 | — | — | — | — | — | — | — | — | 0.3 |

The following evaluation on the pressure-sensitive adhesive sheets (samples) obtained in Examples and Comparative Examples described above was performed. The evaluation results are shown in Table 2.

<Measurement of Gel Fraction>

A predetermined amount (initial weight $W_1$) was sampled from the pressure-sensitive adhesive layer of the pressure-sensitive adhesive sheet. The sample was immersed and stored in an ethyl acetate solution at room temperature for 1 week. The insoluble matter was then taken out and measured for dry weight ($W_2$). The gel fraction of the sample was determined from the following formula: Gel fraction=($W_2$/$W_1$)×100

The measurement of gel fraction on the measurement samples was performed before and after radiation irradiation, respectively. The radiation irradiation was carried out under the condition of an ultraviolet irradiation amount of 2500 mJ/cm$^2$ using a high-pressure mercury lamp.

<Measurement of Shear Storage Modulus>

The shear storage moduli at 23° C. and 70° C. were determined by dynamic viscoelasticity measurement. The pressure-sensitive adhesive sheet was laminated to give a laminate of about 1.5 mm thickness (laminated pressure-sensitive adhesive layer). The laminate was used as a measurement sample. The dynamic viscoelasticity of the measurement sample was measured by using a dynamic viscoelasticity measurement device (device name "ARES", manufactured by TA Instruments Japan, Inc.) under the conditions of a frequency of 1 Hz within a temperature range of −20 to 100° C. and a temperature rising rate of 5° C./minute, and then the shear storage moduli at 23° C. and 70° C. was calculated. The measurement of the shear storage modulus for the measurement sample was performed before and after radiation irradiation, respectively. The radiation irradiation was carried out under the condition of an ultraviolet irradiation amount of 2500 mJ/cm$^2$ using a high-pressure mercury lamp.

<Evaluation Method of Ink Step Absorbability>

A sheet piece of 50 mm in width and 100 mm in length was cut out from the pressure-sensitive adhesive sheet. One release liner was peeled off from the sheet piece and the pressure-sensitive adhesive layer side of the sheet piece was bonded to a COP (cyclic polyolefin) film (100 µm in thickness) by using a hand roller.

Then, the other release liner was peeled off from the sheet piece bonded to the COP film. Glass plates having a printing step were bonded under the bonding conditions shown below so that the surface with step due to the printing of the glass plate and the pressure-sensitive adhesive layer of the COP film were in contact with each other. Then, a sample for evaluation having a structure of COP film/pressure-sensitive adhesive layer/glass plate having a printing step was obtained.

(Bonding Conditions)
Surface pressure: 0.3 MPa
Rate of bonding: 25 mm/s
Hardness of roll rubber: 70°

It should be noted that a glass plate wherein a print having a thickness of 50 µm or 80 µm in the printed part (height of printing step) was given on one surface of the glass plate (100 mm in length, 50 mm in width, and 0.7 mm in thickness, manufactured by Matsunami Glass Ind., Ltd.) was used as the glass plate having a printing step.

An index indicating the ink step absorbability of (ink step/thickness of pressure-sensitive adhesive layer)×100(%) is 50% and 80%, respectively.

Next, the sample for evaluation was charged into an autoclave and subjected to autoclave treatment under a pressure of 5 atm and at a temperature of 50° C. for 15 minutes. After the autoclave treatment, the sample for evaluation was taken out to visually observe the bonding state between the pressure-sensitive adhesive layer and the glass plate having a printing step, and the ink step absorbability was evaluated according to the following evaluation criteria.

◯: No air bubbles remain and no floating occurs between pressure-sensitive adhesive layer and glass plate with printing step X: Air bubbles remain, and floating occurs between pressure-sensitive adhesive layer and the glass plate with printing step <Evaluation Method of Adhesion Reliance>

The sample for evaluation (laminate) after the autoclave treatment in the <Evaluation Method of Ink Step Absorbability> was subjected to ultraviolet irradiation (amount of ultraviolet irradiation; 2500 mJ/cm$^2$) to cure the pressure-sensitive adhesive layer. Then, the sample for evaluation was placed under the conditions of heating (85° C.) and humidification (60° C./95% RH) for 24 hours, and the adhesion reliance was evaluated according to the following evaluation criteria.

◯: No air bubbles remain and no floating occurs between pressure-sensitive adhesive layer and glass plate with printing step X: Air bubbles remain, and floating occurs between pressure-sensitive adhesive layer and the glass plate with printing step <Dielectric Constant>

A pressure-sensitive adhesive layer having a thickness of 100 µm (obtained by peeling a silicone-treated PET film from the pressure-sensitive adhesive sheet after being cured by ultraviolet irradiation at an amount of 2500 mJ/cm$^2$) was sandwiched between a copper foil and an electrode. Then, a relative dielectric constant at a frequency of 100 kHz was measured using the following device. Three samples were prepared for the measurement and the average of the measured values on the three samples was taken as a dielectric constant.

The relative dielectric constant of the pressure-sensitive adhesive layer at a frequency of 100 kHz was measured under the following conditions in accordance with JIS K 6911.

Measurement method: Capacitance method (Device: Agilent Technologies 4294A Precision Impedance Analyzer was used)

Electrode constitution: 12.1 mmϕ, 0.5 mm thick aluminum plate

Counter electrode: 3 oz copper plate

Measurement environment: 23±1° C., 52±1% RH

<Processability Test>

Figure 2A:
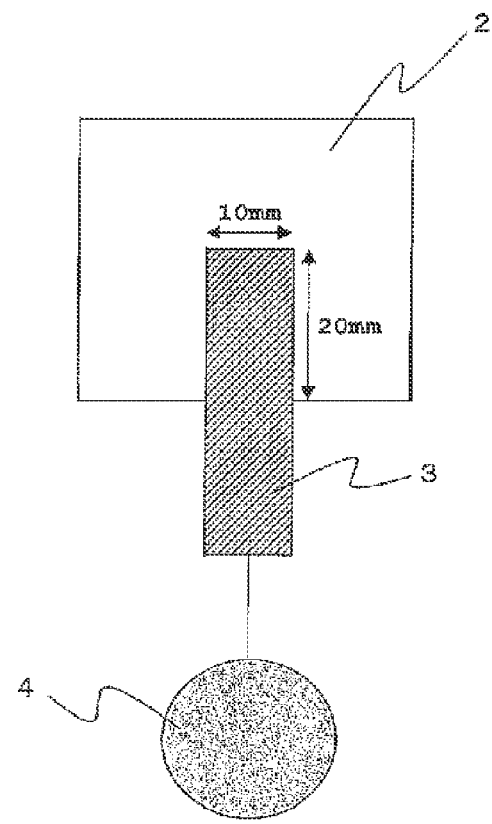
FIG. 2($a$) is a schematic view showing a measurement method in a processability test, and FIG. 2($b$) is a view showing a distance-time curve in a processability test.

One release liner (polyester film) of the pressure-sensitive adhesive sheet according to each Example and Comparative Example was peeled off and a 25 µm-thick polyethylene terephthalate film was bonded to the sheet. The resultant sheet was cut into a size of 10 mm (width)×40 mm (length), which was used as a test piece. As shown in FIG. 2(*a*), the pressure-sensitive adhesive surface of a test piece 3 having an area of 10 mm (width)×20 mm (length) was bonded to a Bakelite plate 2 that had been cleaned with toluene, and the laminate was allowed to stand under an atmosphere of 27° C. for 30 minutes. Thereafter, a weight 4 was hung at one end of the test piece so that a load of 500 g was applied to the shear direction. After hanging the weight 4, a deformation amount up to 60 minutes after 30 minutes (a distance of the movement of the test piece in the shearing direction in the plastic deformation region (unit: mm)) was measured by a displacement meter (not shown); and ease of movement (slope) of the test piece was calculated from the displacement amount by the following equation. The value equivalent to or less than 4.0 (mm/time) was evaluated as good processability (○); the value exceeding 4.0 (mm/time) and less than 7.0 (mm/time) was evaluated as medium processability (Δ); and the value equivalent to or more than 7.0 (mm/time) was evaluated as poor processability (x).

Ease of movement of test piece (mm/time)=(movement distance in plastic deformation region (mm))/(0.5 hours)

Figure 2B:
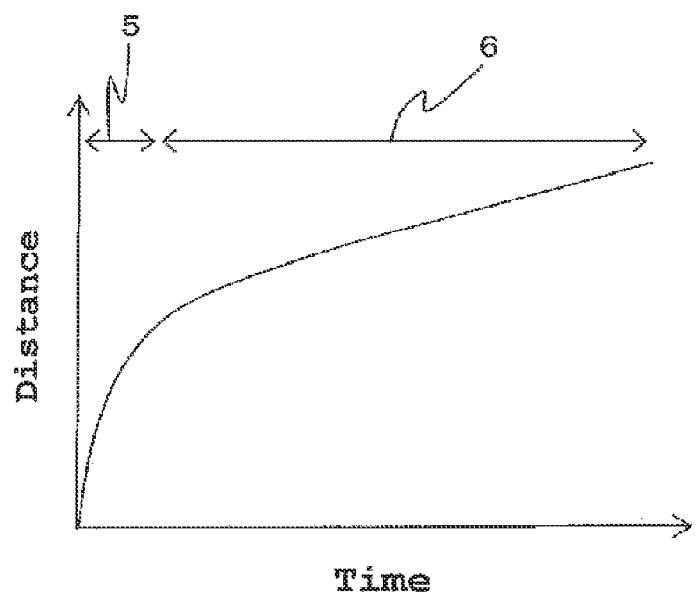

Here, FIG. 2(b) is a distance-time curve in the processability test. The vertical axis indicates the distance of the movement of the test piece in the shearing direction, and the horizontal axis indicates the time after hanging the weight. The plastic deformation region is shown at 30 minutes to 60 minutes after hanging the weight (6 in FIG. 2(b)), and an elastic deformation region is immediately after hanging the weight (5 in FIG. 2(b)).

NVP represents N-vinyl-2-pyrrolidone (manufactured by Nippon Shokubai Co., Ltd.);

NVC represents N-vinyl-∈-caprolactam;

4HBA represents 4-hydroxybutyl acrylate;

HEA represents 2-hydroxyethyl acrylate; and

MBP represents 4-methacryloyloxybenzophenone.

D110N represents trimethylolpropane adduct of xylylene diisocyanate (manufactured by Mitsui Chemicals, Inc.).

APG-400 represents polypropylene glycol (#400) diacrylate (manufactured by Shin-Nakamura Chemical Co., Ltd.);

APG-700 represents polypropylene glycol (#700) diacrylate (manufactured by Shin-Nakamura Chemical Co., Ltd.);

MOI represents 2-methacryloyloxyethyl isocyanate;

HX-620 represents di(meth)acrylate of ∈-caprolactone adduct of hydroxypivalic acid neopentylglycol (KAYARAD HX-620, manufactured by Nippon Kayaku Co., Ltd.);

A-PTMG65 represents polytetramethylene glycol (#650) diacrylate (manufactured by Shin-Nakamura Chemical Co., Ltd.); and M-1200 represents urethane acrylate (manufactured by TOAGOSEI CO., LTD.).

TABLE 2

| | Pressure-sensitive adhesive layer | | | | | Evaluation | | | | | | |
|---|---|---|---|---|---|---|---|---|---|---|---|---|
| | Gel fraction (%) | | Storage modulus ($\times 10^4$ Pa) | | | | Ink step absorbability | | Adhesion reliance | | | Processability | |
| | | | 23° C.: | 23° C.: | 70° C.: | 70° C.: | | | | 60° C./ | Dielectric | Slope | |
| | Before curing | After curing | before curing | after curing | before curing | after curing | 50% | 80% | 85° C. | 95% RH | constant | (mm/time) | Judgment |
| Example 1 | 30.5 | 65.2 | 3.85 | 10.33 | 1.73 | 3.87 | ○ | ○ | ○ | ○ | 3.19 | 3.3 | ○ |
| Example 2 | 12.7 | 72.1 | 2.02 | 21.35 | 1.30 | 10.19 | ○ | ○ | ○ | ○ | 3.52 | 7.9 | x |
| Example 3 | 8.4 | 69.3 | 1.57 | 40.42 | 1.40 | 9.40 | ○ | ○ | ○ | ○ | 3.01 | 10.4 | x |
| Example 4 | 23.8 | 53.8 | 4.70 | 10.82 | 1.53 | 3.62 | ○ | ○ | ○ | ○ | 3.34 | 6.3 | Δ |
| Example 5 | 19.2 | 54.5 | 4.17 | 14.96 | 1.42 | 3.48 | ○ | ○ | ○ | ○ | 3.26 | 7.6 | x |
| Example 6 | 33.3 | 65.3 | 4.12 | 11.26 | 1.96 | 4.13 | ○ | ○ | ○ | ○ | 3.21 | 3.1 | ○ |
| Example 7 | 43.0 | 57.2 | 4.32 | 15.39 | 1.46 | 3.33 | ○ | ○ | ○ | ○ | 3.30 | 1.7 | ○ |
| Example 8 | 10.7 | 44.9 | 4.05 | 10.79 | 0.57 | 1.85 | ○ | ○ | ○ | ○ | 3.10 | 7.8 | x |
| Example 9 | 24.5 | 61.2 | 2.76 | 11.82 | 0.21 | 2.43 | ○ | ○ | ○ | ○ | 3.12 | 6.3 | Δ |
| Example 10 | 15.6 | 59.5 | 6.79 | 15.22 | 0.93 | 2.37 | ○ | ○ | ○ | ○ | 2.99 | 7.4 | x |
| Example 11 | 32.8 | 55.8 | 7.11 | 77.51 | 1.15 | 3.64 | ○ | ○ | ○ | ○ | 2.72 | 3.8 | ○ |
| Example 12 | 36.6 | 52.1 | 9.84 | 206.49 | 1.22 | 4.07 | ○ | ○ | ○ | ○ | 2.74 | 3.2 | ○ |
| Example 13 | 44.4 | 67.0 | 3.00 | 5.13 | 1.13 | 2.34 | ○ | ○ | ○ | ○ | 4.01 | 4.0 | ○ |
| Example 14 | 28.4 | 43.5 | 5.56 | 46.18 | 1.70 | 5.23 | ○ | ○ | ○ | ○ | 2.68 | 4.2 | Δ |
| Example 15 | 14.5 | 93.6 | 8.93 | 8.94 | 3.92 | 4.27 | ○ | ○ | ○ | ○ | 3.36 | 7.8 | x |
| Comparative Example 1 | 64.7 | — | 12.00 | — | 4.38 | — | x | x | x | x | 3.08 | 0.6 | ○ |
| Comparative Example 2 | 52.6 | 92.0 | 1.74 | 47.15 | 1.07 | 17.40 | x | x | x | x | 5.02 | 7.0 | x |
| Comparative Example 3 | 2.6 | 31.1 | 13.19 | 14.65 | 1.66 | 3.00 | x | x | x | x | 3.59 | 0.8 | ○ |

In Table 1, 2EHA represents 2-ethylhexyl acrylate (manufactured by TOAGOSEI CO., LTD., Tg of homopolymer=−70° C.);

ISTA represents isostearyl acrylate (manufactured by Osaka Organic Chemical Industry Ltd., Tg of homopolymer=−18° C.);

LMA represents lauryl methacrylate;

LA represents lauryl acrylate;

iDMA represents isodecyl methacrylate;

AA represents acrylic acid;

MMA represents methyl methacrylate;

DESCRIPTION OF REFERENCE SIGNS

1 Capacitance touch panel
11 Decorative panel
12 Pressure-sensitive adhesive layer or Pressure-sensitive adhesive sheet
13 ITO film
14 Hard coated film
2 Bakelite plate
3 Test piece
4 Weight 5 Elastic deformation region
6 Plastic deformation region

What is claimed is:

1. A radiation-curable pressure-sensitive adhesive layer, wherein the radiation-curable pressure-sensitive adhesive layer is obtained from a radiation-curable pressure-sensitive adhesive comprising a radically polymerizable functional group containing a carbon-carbon double bond and a (meth)acryl-based polymer obtained by polymerizing a monomer component containing 30 to 90% by weight of an alkyl (meth)acrylate having an alkyl group of 13 to 22 carbon atoms at an ester end, wherein the alkyl group of the alkyl (meth)acrylate polymer having an alkyl group of 13 to 22 carbon atoms at an ester end is a branched alkyl group, and
the monomer component further contains 5 to 25% by weight of a cyclic nitrogen-containing monomer,
wherein in the radiation-curable pressure-sensitive adhesive layer after radiation curing, a shear storage modulus at 23° C. is $5.0 \times 10^4$ to $2.0 \times 10^5$ Pa.

2. The radiation-curable pressure-sensitive adhesive layer according to claim 1, wherein the monomer component is a monomer component further containing 1 to 20% by weight of at least one functional group-containing monomer selected from a carboxyl group-containing monomer, a hydroxyl group-containing monomer, and a cyclic ether group-containing monomer.

3. The radiation-curable pressure-sensitive adhesive layer according to claim 1, wherein the monomer component is a monomer component further containing 0.5% by weight or more of at least one alkyl (meth)acrylate selected from an alkyl (meth)acrylate having an alkyl group of 1 to 9 carbon atoms at an ester end and an alkyl (meth)acrylate having a cyclic alkyl group at an ester end.

4. The radiation-curable pressure-sensitive adhesive layer according to claim 1, wherein the radiation-curable pressure-sensitive adhesive contains, in addition to the (meth)acryl-based polymer, a compound having at least one radically polymerizable functional group containing a carbon-carbon double bond in the molecule.

5. The radiation-curable pressure-sensitive adhesive layer according to claim 1, wherein the (meth)acryl-based polymer is a (meth)acryl-based polymer having a radically polymerizable functional group containing a carbon-carbon double bond.

6. The radiation-curable pressure-sensitive adhesive layer according to claim 1, wherein the radiation-curable pressure-sensitive adhesive further contains 0.005 to 5 parts by weight of a crosslinking agent based on 100 parts by weight of the (meth)acryl-based polymer.

7. The radiation-curable pressure-sensitive adhesive layer according to claim 1, wherein
before radiation curing, a shear storage modulus at 70° C. is $2.0 \times 10^3$ to $4.0 \times 10^4$ Pa and a gel fraction is 0 to 60% by weight, and
after radiation curing, a shear storage modulus at 70° C. is $1.5 \times 10^4$ to $1.5 \times 10^5$ Pa and a gel fraction is 40 to 95% by weight.

8. The radiation-curable pressure-sensitive adhesive layer according to claim 1, wherein a relative dielectric constant at a frequency of 100 kHz of the radiation-curable pressure-sensitive adhesive layer is 3.7 or less.

9. A radiation-curable pressure-sensitive adhesive sheet, comprising a support and the radiation-curable pressure-sensitive adhesive layer according to claim 1 formed on at least one side of the support.

10. The radiation-curable pressure-sensitive adhesive sheet according to claim 9, wherein the support is an optical member.

11. A laminate comprising a first member and a second member being bonded with the radiation-curable pressure-sensitive adhesive layer according to claim 1 interposed therebetween.

12. The laminate according to claim 11, wherein at least one of the first member and the second member is a member having a surface with an ink step, and the ink step (μm) and a thickness (μm) of a pressure-sensitive adhesive layer satisfy the following expression:

(ink step/thickness of pressure-sensitive adhesive layer)≤0.9.

13. The laminate according to claim 11, wherein at least one of the first member and the second member is an optical member.

* * * * *